US012786073B2

(12) United States Patent
Park et al.

(10) Patent No.: US 12,786,073 B2
(45) Date of Patent: Nov. 3, 2026

(54) METHOD AND DEVICE FOR TRANSMITTING AND RECEIVING SIGNAL IN WIRELESS COMMUNICATION SYSTEM

(71) Applicant: LG ELECTRONICS INC., Seoul (KR)

(72) Inventors: Haewook Park, Seoul (KR); Hyungtae Kim, Seoul (KR); Seongwon Go, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 136 days.

(21) Appl. No.: 18/869,595

(22) PCT Filed: Jun. 29, 2023

(86) PCT No.: PCT/KR2023/009106
§ 371 (c)(1),
(2) Date: Nov. 26, 2024

(87) PCT Pub. No.: WO2024/019352
PCT Pub. Date: Jan. 25, 2024

(65) Prior Publication Data

US 2025/0300903 A1 Sep. 25, 2025

(30) Foreign Application Priority Data

Jul. 21, 2022 (KR) ........................ 10-2022-0090483

(51) Int. Cl.
*G06F 15/16* (2006.01)
*G06N 3/045* (2023.01)
(Continued)

(52) U.S. Cl.
CPC ............. *H04L 41/16* (2013.01); *G06N 3/045* (2023.01); *G06N 3/08* (2013.01); *G06N 20/00* (2019.01);
(Continued)

(58) Field of Classification Search
CPC ..... H04L 5/0023; H04L 5/0053; H04L 41/16; H04W 72/231; H04W 72/232;
(Continued)

(56) References Cited

U.S. PATENT DOCUMENTS 11,310,734 B2 * 4/2022 Kim ...................... H04W 16/18
11,917,527 B2 * 2/2024 Chou .................... H04W 48/18
(Continued)

FOREIGN PATENT DOCUMENTS

KR 1020220083976 6/2022

OTHER PUBLICATIONS

PCT International Application Number PCT/KR2023/009106, International Search Report dated Oct. 16, 2023, 7 pages.
(Continued)

*Primary Examiner* — Moustafa M Meky
(74) *Attorney, Agent, or Firm* — LEE, HONG, DEGERMAN, KANG & WAIMEY

(57) ABSTRACT

A terminal according to at least one of embodiments disclosed in the present specification may receive artificial intelligence/machine learning (AI/ML)-related configuration information, configure an AI/ML model for at least one transmission reception point (TRP) on the basis of the AI/ML-related configuration information, and receive information for management of the configured AI/ML model, wherein, on the basis of the terminal supporting multiple TRPs, the information for management of the AI/ML model indicates AI/ML model activation, deactivation, update, or switching individually for each of the multiple TRPs.

12 Claims, 14 Drawing Sheets

(51) Int. Cl.

| | |
|---|---|
| ***G06N 3/08*** | (2023.01) |
| ***G06N 20/00*** | (2019.01) |
| ***G06N 20/20*** | (2019.01) |
| ***H04B 7/024*** | (2017.01) |
| ***H04B 7/06*** | (2006.01) |
| ***H04L 41/16*** | (2022.01) |
| ***H04W 72/231*** | (2023.01) |
| ***H04W 72/232*** | (2023.01) |

(52) U.S. Cl.

CPC ............. *G06N 20/20* (2019.01); *H04B 7/024* (2013.01); *H04B 7/06952* (2023.05); *H04W 72/231* (2023.01); *H04W 72/232* (2023.01)

(58) Field of Classification Search

CPC .... H04B 7/024; H04B 7/06952; G06N 3/045; G06N 20/00; G06N 20/20; G06N 20/3108

USPC .......................................................... 709/223

See application file for complete search history.

(56) References Cited

U.S. PATENT DOCUMENTS

| | | | | |
|---|---|---|---|---|
| 12,210,590 | B2 * | 1/2025 | Menard | G06F 18/217 |
| 12,265,818 | B2 * | 4/2025 | Oros | G06N 20/00 |
| 12,375,247 | B2 * | 7/2025 | Cirik | H04L 5/0053 |
| 2020/0134374 | A1 * | 4/2020 | Oros | G06N 3/09 |
| 2022/0294666 | A1 * | 9/2022 | Jeon | H04L 25/0254 |
| 2023/0100253 | A1 * | 3/2023 | Zhu | G06N 3/0464 706/26 |
| 2023/0284139 | A1 * | 9/2023 | Ma | H04B 7/0626 370/329 |
| 2023/0368077 | A1 * | 11/2023 | Yao | G06N 20/00 |
| 2023/0403588 | A1 * | 12/2023 | Kumar | H04L 41/16 |
| 2024/0187127 | A1 * | 6/2024 | Narayanan Thangaraj | H04L 1/0026 |
| 2024/0298225 | A1 * | 9/2024 | Hyde | H04W 36/0083 |
| 2025/0016774 | A1 * | 1/2025 | Wang | G06N 3/0455 |
| 2025/0184768 | A1 * | 6/2025 | Wang | H04W 24/02 |
| 2025/0219898 | A1 * | 7/2025 | Li | H04L 41/0803 |
| 2025/0227497 | A1 * | 7/2025 | Li | H04W 24/10 |
| 2025/0278457 | A1 * | 9/2025 | Menard | G06F 18/217 |
| 2025/0301433 | A1 * | 9/2025 | Zhang | H04W 56/0045 |
| 2025/0330373 | A1 * | 10/2025 | Chen Larsson | G06N 20/00 |
| 2026/0095291 | A1 * | 4/2026 | Cirik | H04L 5/0053 |

OTHER PUBLICATIONS

Spreadtrum Communications, “Discussion on other aspects on AI/ML for beam management,” 3GPP TSG RAN WG1 #109-e, R1-2204501, Apr. 2022, 5 pages.

Samsung, “Evaluation on AI/ML for beam management,”3GPP TSG RAN WG1 #109-e, R1-2203899, Apr. 2022, 24 pages.

Qualcomm, “Summary of General Aspects of AI/ML Framework,” 3GPP TSG RAN WG1 #109-e, R1-2205474, May 2022, 7 pages.

* cited by examiner

METHOD AND DEVICE FOR TRANSMITTING AND RECEIVING SIGNAL IN WIRELESS COMMUNICATION SYSTEM

CROSS-REFERENCE TO RELATED APPLICATION(S)

This application is the National Stage filing under 35 U.S.C. 371 of International Application No. PCT/KR2023/009106, filed on Jun. 29, 2023, which claims the benefit of earlier filing date and right of priority to Korean Application No. 10-2022-0090483, filed on Jul. 21, 2022, the contents of which are all incorporated by reference herein in their entirety.

TECHNICAL FIELD

The disclosure relates to a wireless communication system, and more particularly, to a method and apparatus for transmitting/receiving an uplink/downlink wireless signal in a wireless communication system.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the disclosure is to provide a method of efficiently performing wireless signal transmission/reception procedures and an apparatus therefor.

It will be appreciated by persons skilled in the art that the objects that could be achieved with the disclosure are not limited to what has been particularly described hereinabove and the above and other objects that the disclosure could achieve will be more clearly understood from the following detailed description.

Technical Solution

In an aspect of the present disclosure, provided herein is a method of operating a user equipment (UE) in a wireless communication system. The method may include: receiving artificial intelligence/machine learning (AI/ML) related configuration information; configuring an AI/ML model for at least one transmission reception point (TRP) based on the received AI/ML related configuration information; and receiving information for management of the configured AI/ML model. Based on that the UE supports multiple TRPs, the information for the management of the AI/ML model may individually indicate activation, deactivation, updating, or switching of the AI/ML model for each of the multiple TRPs.

The information for the management of the AI/ML model may be received through a medium access control (MAC) control element (CE).

The information for the management of the AI/ML model may be received through downlink control information (DCI).

The AI/ML related configuration information may be received through higher layer signaling.

A timer related to the activation, deactivation, updating, or switching of the AI/ML model may be configured individually for each of the multiple TRPs.

The timer may be configured through network signaling.

The timer may be restarted based on the reception of the information for the management of the AI/ML model.

The information for the management of the AI/ML model may include a relevant AI/ML model identifier (ID) or a relevant AI/ML functionality ID.

The indicated activation, deactivation, updating, or switching of the AI/ML model may be performed based on a reception timing of the information for the management of the AI/ML model or a transmission timing of an acknowledgment (ACK) for the information for the management of the AI/ML model.

In another aspect of the present disclosure, provided herein is a computer-readable recording medium having recorded thereon a program for executing the method described above.

In another aspect of the present disclosure, provided herein is a UE configured to perform the method described above.

In another aspect of the present disclosure, provided herein is a device configured to control a UE performing the method described above.

In another aspect of the present disclosure, provided herein is a method of operating a base station (BS) in a wireless communication system. The method may include: transmitting AI/ML related configuration information to a UE to configure an AI/ML model for at least one TRP; and transmit information for management of the AI/ML model configured to the UE. Based on that the UE supports multiple TRPs, the information for the management of the AI/ML model may individually indicate activation, deactivation, updating, or switching of the AI/ML model for each of the multiple TRPs.

In a further aspect of the present disclosure, provided herein is a BS configured to perform the method described above.

Advantageous Effects

According to the disclosure, wireless signal transmission and reception may be efficiently performed in a wireless communication system.

It will be appreciated by persons skilled in the art that the effects that can be achieved with the disclosure are not limited to what has been particularly described hereinabove and other advantages of the disclosure will be more clearly understood from the following detailed description taken in conjunction with the accompanying drawings.

DETAILED DESCRIPTION

Figure 1:
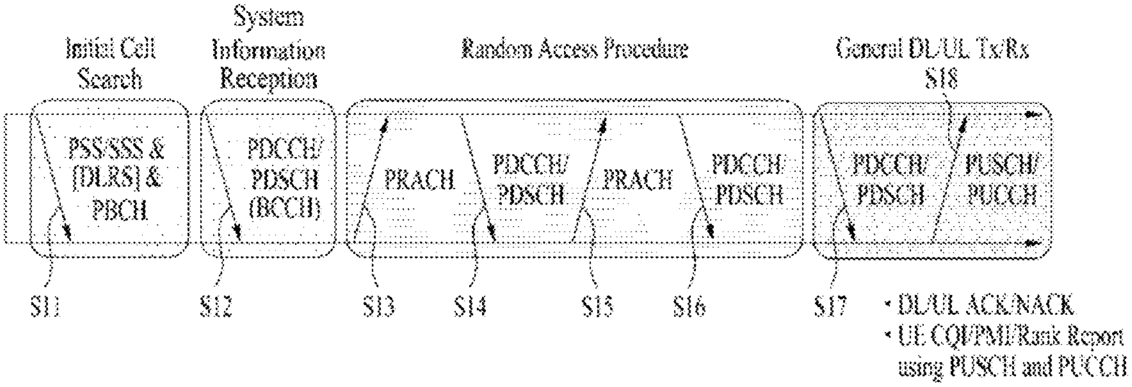
FIG. 1 illustrates physical channels used in a 3rd generation partnership project (3GPP) system as an exemplary wireless communication system, and a general signal transmission method using the same.

Embodiments of the disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the disclosure, for simplicity, this technology will be referred to as NR (New Radio or New RAT).

For the sake of clarity, 3GPP NR is mainly described, but the technical idea of the disclosure is not limited thereto.

In the disclosure, the term “set/setting” may be replaced with “configure/configuration”, and both may be used interchangeably. Further, a conditional expression (e.g., “if”, “in a case”, or “when”) may be replaced by “based on that” or “in a state/status”. In addition, an operation or software/hardware (SW/HW) configuration of a user equipment (UE)/base station (BS) may be derived/understood based on satisfaction of a corresponding condition. When a process on a receiving (or transmitting) side may be derived/understood from a process on the transmitting (or receiving) side in signal transmission/reception between wireless communication devices (e.g., a BS and a UE), its description may be omitted. Signal determination/generation/encoding/transmission of the transmitting side, for example, may be understood as signal monitoring reception/decoding/determination of the receiving side. Further, when it is said that a UE performs (or does not perform) a specific operation, this may also be interpreted as that a BS expects/assumes (or does not expect/assume) that the UE performs the specific operation. When it is said that a BS performs (or does not perform) a specific operation, this may also be interpreted as that a UE expects/assumes (or does not expect/assume) that the BS performs the specific operation. In the following description, sections, embodiments, examples, options, methods, schemes, and so on are distinguished from each other and indexed, for convenience of description, which does not mean that each of them necessarily constitutes an independent invention or that each of them should be implemented only individually. Unless explicitly contradicting each other, it may be derived/understood that at least some of the sections, embodiments, examples, options, methods, schemes, and so on may be implemented in combination or may be omitted.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
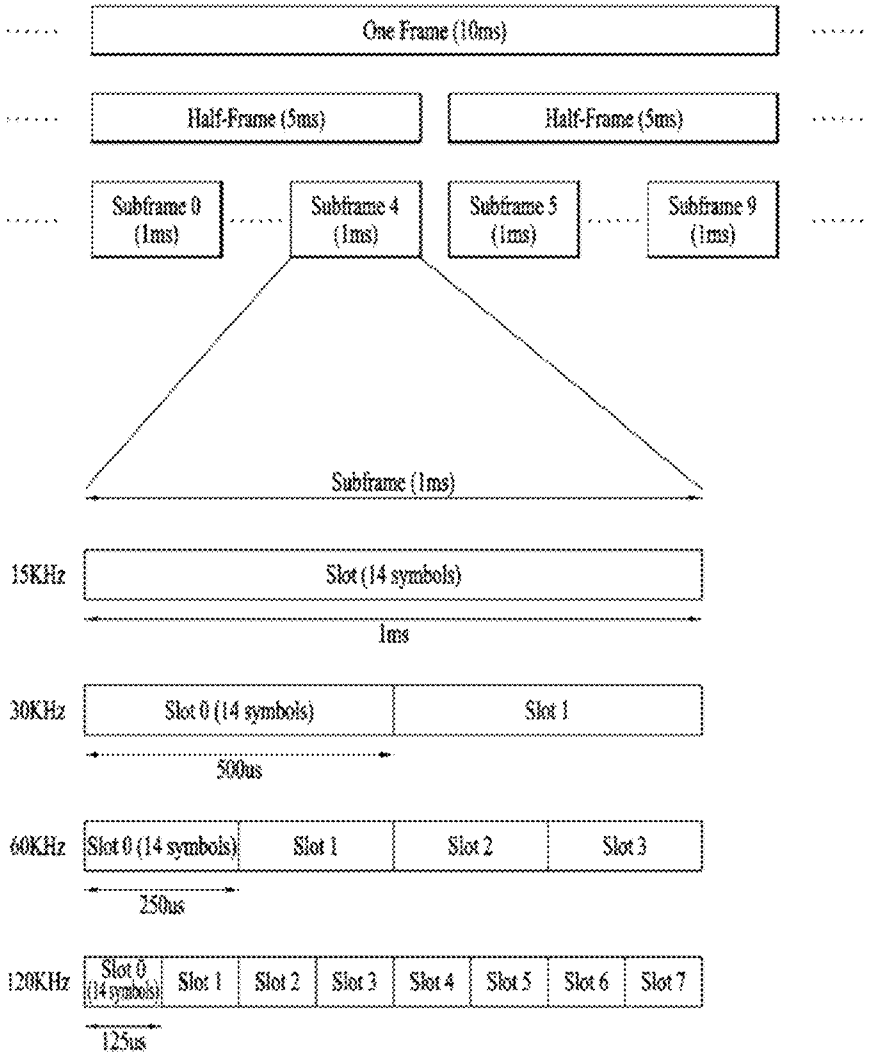
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15 * 2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

$N^{slot}_{symb}$: Number of symbols in a slot $N^{frame,\mu}_{slot}$: Number of slots in a frame $N^{subframe,\mu}_{slot}$: Number of slots in a subframe Table 2 illustrates that the number of symbols per slot, the number of slots per frame, and the number of slots per subframe vary according to the SCS when the extended CP is used.

TABLE 2

| SCS ($15 * 2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
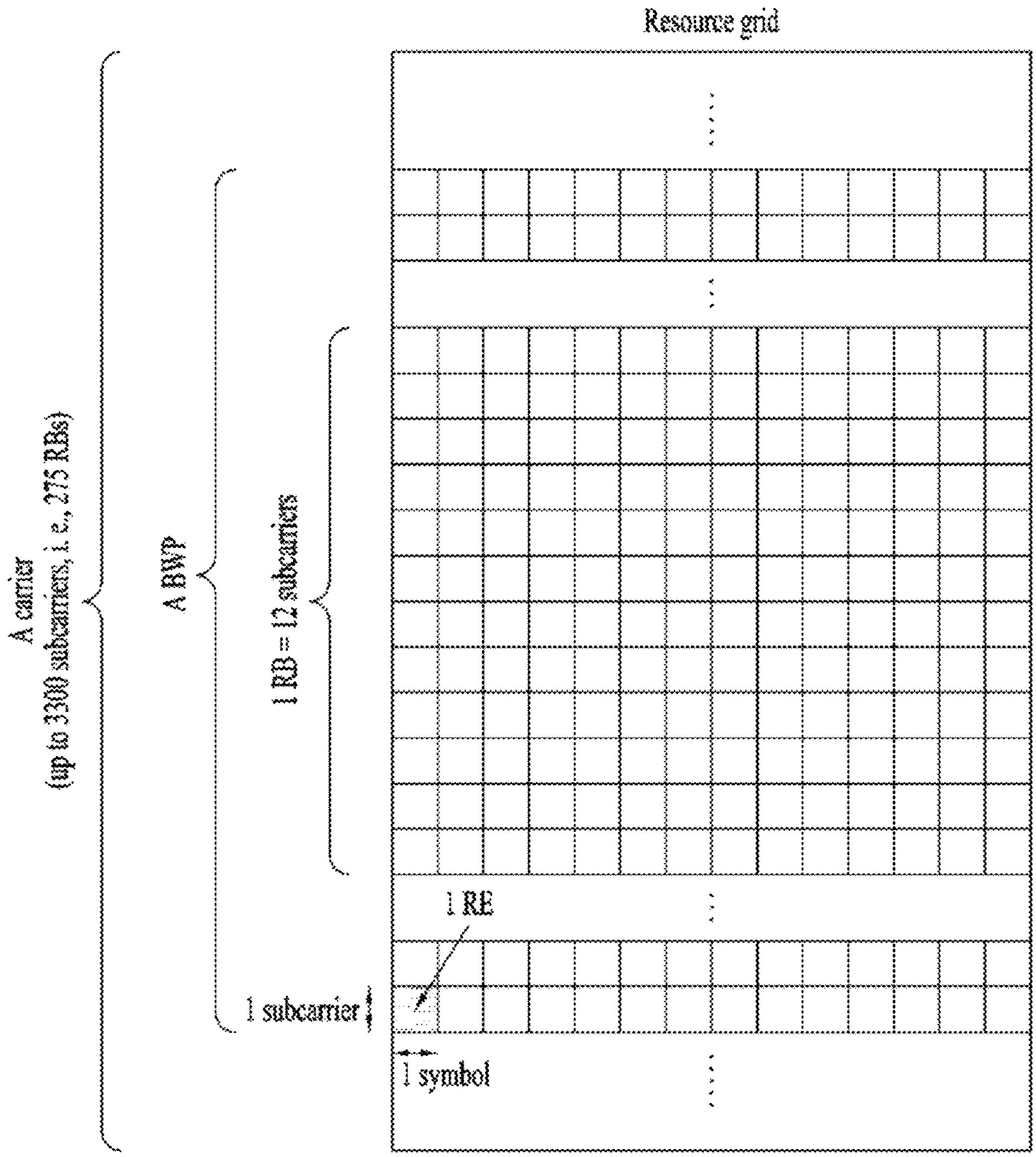
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
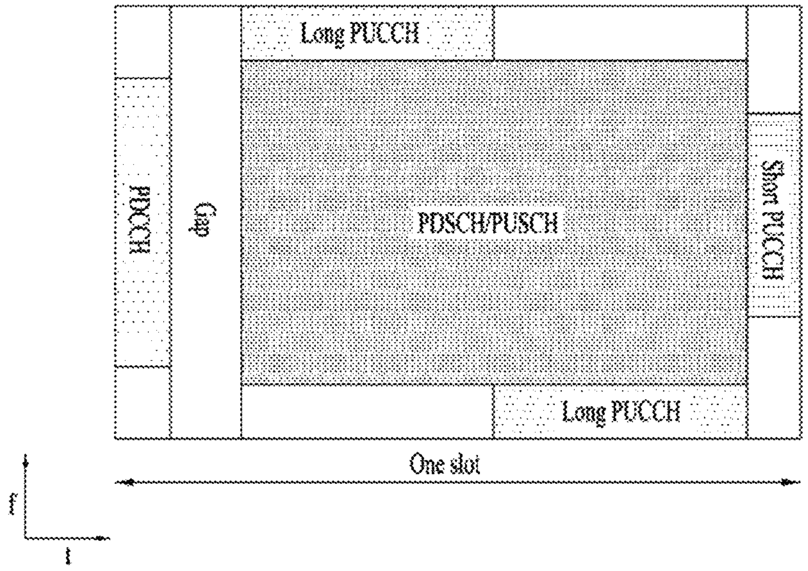
FIG. 4 illustrates exemplary mapping of physical channels in a slot.

FIG. 4 illustrates exemplary mapping of physical channels in a slot. A PDCCH may be transmitted in a DL control region, and a PDSCH may be transmitted in a DL data region. A PUCCH may be transmitted in a UL control region, and a PUSCH may be transmitted in a UL data region. A guard period (GP) provides a time gap for transmission mode-to-reception mode switching or reception mode-to-transmission mode switching at a BS and a UE. Some symbol at the time of DL-to-UL switching in a subframe may be configured as a GP.

Each physical channel will be described below in greater detail.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH includes 1, 2, 4, 8, or 16 control channel elements (CCEs) according to its aggregation level (AL). A CCE is a logical allocation unit used to provide a PDCCH with a specific code rate according to a radio channel state. A CCE includes 6 resource element groups (REGs), each REG being defined by one OFDM symbol by one (P) RB. The PDCCH is transmitted in a control resource set (CORESET). A CORESET is defined as a set of REGs with a given numerology (e.g., an SCS, a CP length, and so on). A plurality of CORESETs for one UE may overlap with each other in the time/frequency domain. A CORESET may be configured by system information (e.g., a master information block (MIB)) or UE-specific higher-layer signaling (e.g., radio resource control (RRC) signaling). Specifically, the number of RBs and the number of symbols (3 at maximum) in the CORESET may be configured by higher-layer signaling.

For PDCCH reception/detection, the UE monitors PDCCH candidates. A PDCCH candidate is CCE(s) that the UE should monitor to detect a PDCCH. Each PDCCH candidate is defined as 1, 2, 4, 8, or 16 CCEs according to an AL. The monitoring includes (blind) decoding PDCCH candidates. A set of PDCCH candidates decoded by the UE are defined as a PDCCH search space (SS). An SS may be a common search space (CSS) or a UE-specific search space (USS). The UE may obtain DCI by monitoring PDCCH candidates in one or more SSs configured by an MIB or higher-layer signaling. Each CORESET is associated with one or more SSs, and each SS is associated with one CORESET. An SS may be defined based on the following parameters.

controlResourceSetId: A CORESET related to an SS.

monitoringSlotPeriodicityAndOffset: A PDCCH monitoring periodicity (in slots) and a PDCCH monitoring offset (in slots).

monitoringSymbolsWithinSlot: PDCCH monitoring symbols in a slot (e.g., the first symbol(s) of a CORESET).

nrofCandidates: The number of PDCCH candidates (one of 0, 1, 2, 3, 4, 5, 6, and 8) for each AL={1, 2, 4, 8, 16}.

An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping may be performed on a codeword basis, and modulation symbols generated from each codeword may be mapped to one or more layers. Each layer together with a demodulation reference signal (DMRS) is mapped to resources, and an OFDM symbol signal is generated from the mapped layer with the DMRS and transmitted through a corresponding antenna port.

The PUCCH delivers uplink control information (UCI). The UCI includes the following information.

SR (Scheduling Request): Information used to request UL-SCH resources.

HARQ (Hybrid Automatic Repeat reQuest)-ACK (Acknowledgement): A response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term HARQ-ACK is interchangeably used with HARQ ACK/NACK and ACK/NACK.

CSI (Channel State Information): Feedback information for a DL channel. Multiple input multiple output (MIMO)-related feedback information includes an RI and a PMI.

Table 5 illustrates exemplary PUCCH formats. PUCCH formats may be divided into short PUCCHs (Formats 0 and 2) and long PUCCHs (Formats 1, 3, and 4) based on PUCCH transmission durations.

TABLE 5

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration.

PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

At least one of one or two or more cells configured in the UE may be configured for PUCCH transmission. At least the primary cell may be configured as a cell for PUCCH transmission. At least one PUCCH cell group may be configured in a UE based on at least one cell for which PUCCH transmission is configured, and each PUCCH cell group includes one or more cells. A PUCCH cell group may be simply referred to as a PUCCH group. PUCCH transmission may be configured for a SCell as well as the primary cell. The primary cell belongs to the primary PUCCH group, and the PUCCH-SCell to which PUCCH transmission is configured belongs to the secondary PUCCH group. The PUCCH on the primary cell may be used for cells belonging to the primary PUCCH group, and the PUCCH on the PUCCH-SCell may be used for cells belonging to the secondary PUCCH group.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or Layer 1 (L1) signaling such as a PDCCH) (configured scheduling or configured grant). The PUSCH transmission may be performed in a codebook-based or non-codebook-based manner.

Figure 5:
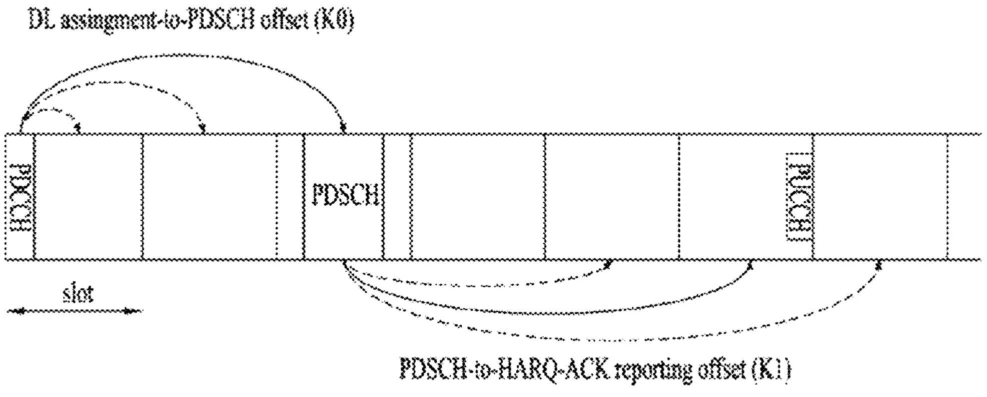
FIG. 5 illustrates an exemplary physical downlink shared channel (PDSCH) and ACK/NACK transmission and reception process.

FIG. 5 illustrates an exemplary ACK/NACK transmission process. Referring to FIG. 5, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 and DCI format 1_1 may include the following information.

Frequency domain resource assignment: Indicates an RB set assigned to a PDSCH.

Time domain resource assignment: Indicates K0 and the starting position (e.g. OFDM symbol index) and length (e.g. the number of OFDM symbols) of the PDSCH in a slot PDSCH-to-HARQ_feedback timing indicator: Indicates K1.

HARQ process number (4 bits): Indicates the HARQ process ID of data (e.g., a PDSCH or TB).

PUCCH resource indicator (PRI): Indicates a PUCCH resource to be used for UCI transmission among a plurality of PUCCH resources in a PUCCH resource set.

After receiving a PDSCH in slot #(n+K0) according to the scheduling information of slot #n, the UE may transmit UCI on a PUCCH in slot #(n+K1). The UCI may include an HARQ-ACK response to the PDSCH. FIG. 5 is based on the assumption that the SCS of the PDSCH is equal to the SCS of the PUCCH, and slot #n1=slot #(n+K0), for convenience, which should not be construed as limiting the disclosure. When the SCSs are different, K1 may be indicated/interpreted based on the SCS of the PUCCH.

In the case where the PDSCH is configured to carry one TB at maximum, the HARQ-ACK response may be configured in one bit. In the case where the PDSCH is configured to carry up to two TBs, the HARQ-ACK response may be configured in 2 bits if spatial bundling is not configured and in 1 bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

Whether the UE should perform spatial bundling for an HARQ-ACK response may be configured for each cell group (e.g., by RRC/higher layer signaling). For example, spatial bundling may be configured for each individual HARQ-ACK response transmitted on the PUCCH and/or HARQ-ACK response transmitted on the PUSCH.

When up to two (or two or more) TBs (or codewords) may be received at one time (or schedulable by one DCI) in a corresponding serving cell (e.g., when a higher layer parameter maxNrofCodeWordsScheduledByDCI indicates 2 TBs), spatial bundling may be supported. More than four layers may be used for a 2-TB transmission, and up to four layers may be used for a 1-TB transmission. As a result, when spatial bundling is configured for a corresponding cell group, spatial bundling may be performed for a serving cell in which more than four layers may be scheduled among serving cells of the cell group. A UE which wants to transmit an HARQ-ACK response through spatial bundling may generate an HARQ-ACK response by performing a (bit-wise) logical AND operation on A/N bits for a plurality of TBs.

For example, on the assumption that the UE receives DCI scheduling two TBs and receives two TBs on a PDSCH based on the DCI, a UE that performs spatial bundling may generate a single A/N bit by a logical AND operation between a first A/N bit for a first TB and a second A/N bit for a second TB. As a result, when both the first TB and the second TB are ACKs, the UE reports an ACK bit value to a BS, and when at least one of the TBs is a NACK, the UE reports a NACK bit value to the BS.

For example, when only one TB is actually scheduled in a serving cell configured for reception of two TBs, the UE may generate a single A/N bit by performing a logical AND operation on an A/N bit for the one TB and a bit value of 1. As a result, the UE reports the A/N bit for the one TB to the BS.

There are plurality of parallel DL HARQ processes for DL transmissions at the BS/UE. The plurality of parallel HARQ processes enable continuous DL transmissions, while the BS is waiting for an HARQ feedback indicating successful or failed reception of a previous DL transmission. Each HARQ process is associated with an HARQ buffer in the medium access control (MAC) layer. Each DL HARQ process manages state variables such as the number of MAC physical data unit (PDU) transmissions, an HARQ feedback for a MAC PDU in a buffer, and a current redundancy version. Each HARQ process is identified by an HARQ process ID.

Figure 6:
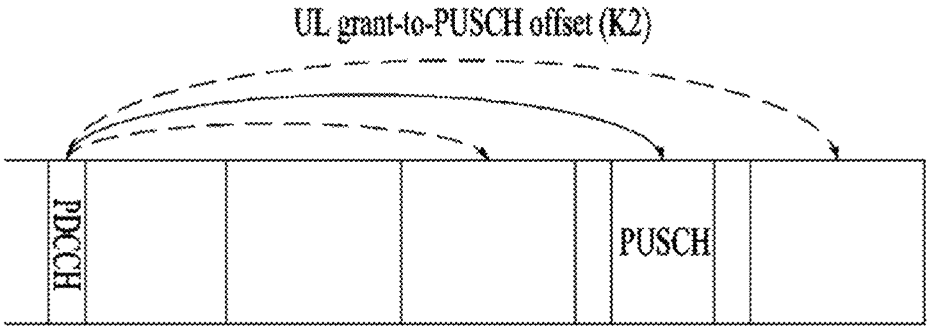
FIG. 6 illustrates an exemplary physical uplink shared channel (PUSCH) transmission process.

FIG. 6 illustrates an exemplary PUSCH transmission procedure. Referring to FIG. 6, the UE may detect a PDCCH in slot #n. The PDCCH includes DL scheduling information (e.g., DCI format 1_0 or 1_1). DCI format 1_0 or 1_1 may include the following information.

- Frequency domain resource assignment: Indicates an RB set assigned to the PUSCH.
- Time domain resource assignment: Indicates a slot offset K2 and the starting position (e.g. OFDM symbol index) and duration (e.g. the number of OFDM symbols) of the PUSCH in a slot. The starting symbol and length of the PUSCH may be indicated by a start and length indicator value (SLIV), or separately.

The UE may then transmit a PUSCH in slot #(n+K2) according to the scheduling information in slot #n. The PUSCH includes a UL-SCH TB.

CSI Related Operation

Figure 7:
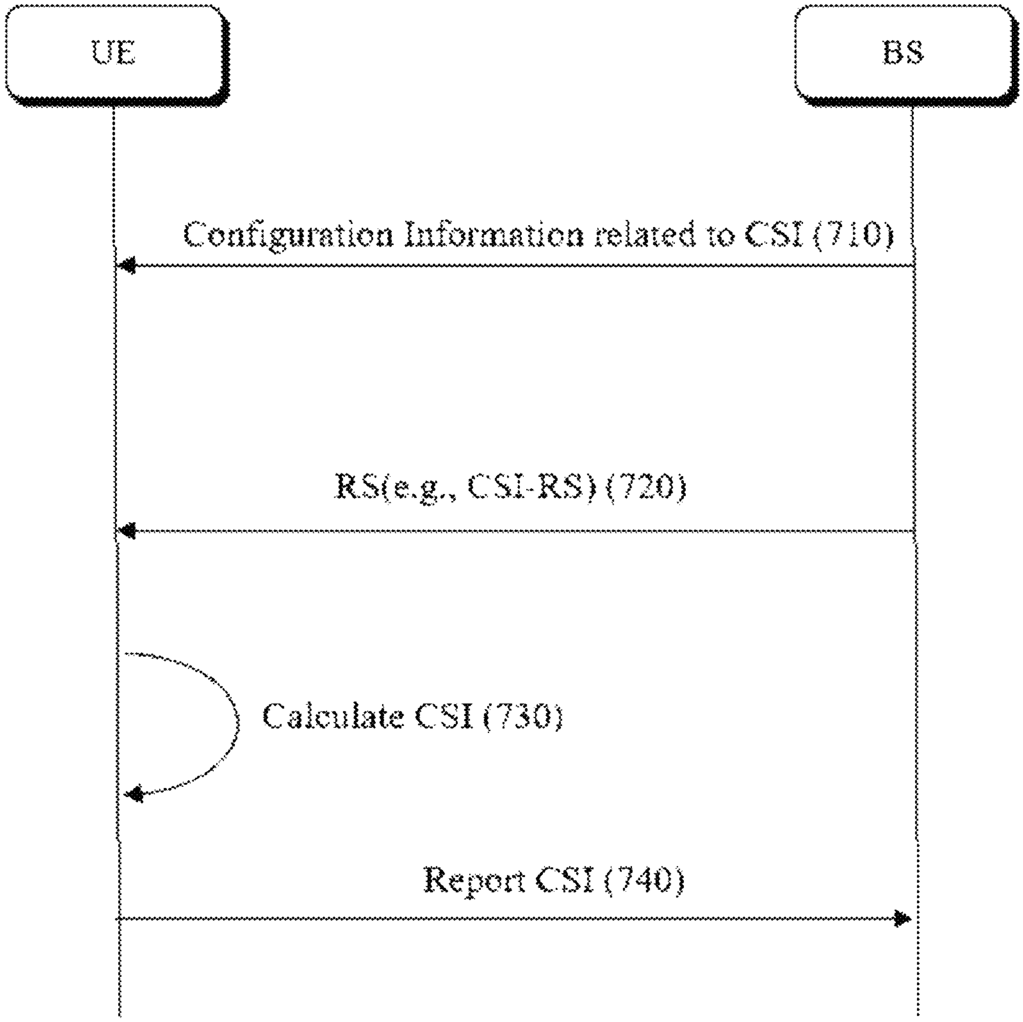
FIG. 7 shows an example of a channel state information (CSI) related procedure.

FIG. 7 shows an example of a CSI related procedure.

The UE receives configuration information related to CSI from the BS via RRC signaling (710). The CSI-related configuration information may include at least one of channel state information-interference measurement (CSI-IM)-related information, CSI measurement-related information, CSI resource configuration-related information, CSI-RS resource-related information, or CSI report configuration-related information.

- A CSI-IM resource may be configured for interference measurement (IM) of the UE. In the time domain, the CSI-IM resource set may be configured periodic, semi-persistent, or aperiodic. The CSI-IM resource may be configured to zero power (ZP)-CSI-RS for the UE. ZP-CSI-RS may be configured to be distinguished from non-zero power (NZP)-CSI-RS.
- The UE may assume that CSI-RS resource(s) for channel measurement configured for one CSI reporting and CSI-IM/NZP CSI-RS resource(s) for interference measurement have a QCL relationship with respect to 'QCL-TypeD' for each resource (when NZP CSI-RS resource(s) are used for interference measurement).
- CSI resource configuration may include at least one of a CSI-IM resource for interference measurement, an NZP CSI-RS resource for interference measurement, and an NZP CSI-RS resource for channel measurement. The channel measurement resource (CMR) may be a NZP CSI-RS for CSI acquisition, and the interference measurement resource (IMR) may be an NZP CSI-RS for CSI-IM and IM.
- A CSI-RS may be configured for one or more UEs. Different CSI-RS configurations may be provided for each UE, or the same CSI-RS configuration may be provided to a plurality of UEs. The CSI-RS may support up to 32 antenna ports. CSI-RSs corresponding to N (N being 1 or more) antenna ports may be mapped to N RE locations within a time-frequency unit corresponding to one slot and one RB. When N is 2 or more, N-port CSI-RSs may be multiplexed in CDM, FDM and/or TDM methods. The CSI-RS may be mapped to the remaining REs except for REs to which CORESET, DMRS, and SSB are mapped. In the frequency domain, the CSI-RS may be configured for the entire bandwidth, a partial bandwidth part (BWP), or a partial bandwidth. The CSI-RS may be transmitted in each RB within the bandwidth in which the CSI-RS is configured (i.e., density=1), or the CSI-RS may be transmitted in every second RB (e.g., even or odd RB) (i.e., density=½). When the CSI-RS is used as a tracking reference signal (TRS), a single-port CSI-RS may be mapped on three subcarriers in each resource block (i.e., density=3). One or more CSI-RS resource sets may be configured for the UE in the time domain. Each CSI-RS resource set may include one or more CSI-RS configurations. Each CSI-RS resource set may be configured periodic, semi-persistent, or aperiodic.
- The CSI report configuration may include configuration for a feedback type, a measurement resource, a report type, and the like. The NZP-CSI-RS resource set may be used for CSI reporting configuration of a corresponding UE. An NZP-CSI-RS resource set may be associated with the CSI-RS or the SSB. A plurality of periodic NZP-CSI-RS resource sets may be configured as TRS resource sets. (i) The feedback types include a channel quality indicator (CQI), a precoding matrix indicator (PMI), a CSI-RS resource indicator (CRI), an SSB resource block indicator (SSBRI), a layer indicator (LI), a rank indicator (RI), a first layer (L1)-reference signal received strength (RSRP), and the like. (ii) The measurement resource may include configuration for a downlink signal and/or downlink resource on which measurement is performed by the UE to determine feedback information. The measurement resource may be configured as a ZP and/or NZP CSI-RS resource set associated with the CSI report configuration. The NZP CSI-RS resource set may include a CSI-RS set or an SSB set. For example, the L1-RSRP may be measured for a CSI-RS set or for an SSB set. (iii) The report type may include configuration for a time when the UE performs a report and an uplink channel. The reporting time may be configured to be periodic, semi-persistent or aperiodic. The periodic CSI report may be transmitted on a PUCCH. The semi-persistent CSI report may be transmitted on a PUCCH or a PUSCH based on a MAC CE indicating activation/deactivation. The aperiodic CSI report may be indicated by DCI signaling. For example, a CSI request field of an uplink grant may indicate one of various report trigger sizes. The aperiodic CSI report may be transmitted on a PUSCH.

The UE measures CSI based on configuration information related to CSI. The CSI measurement may include receiving the CSI-RS (720) and acquiring the CSI by computing the received CSI-RS (730).

The UE may transmit a CSI report to the BS (740). For the CSI report, the time and frequency resource available to the UE are controlled by the BS. Channel state information (CSI) includes at least one of a channel quality indicator (CQI), a precoding matrix indicator (PMI), a CSI-RS resource indicator (CRI), a SS/PBCH block resource indicator (SSBRI), a layer indicator (LI), a rank indicator (RI), an L1-RSRP, and/or an L-SINR.

A time domain behavior of CSI reporting supports periodic, semi-persistent, aperiodic. i) Periodic CSI reporting is performed in a short PUCCH, a long PUCCH. Periodicity and a slot offset of periodic CSI reporting may be configured by RRC and refers to a CSI-ReportConfig IE. ii) SP (semi-periodic) CSI reporting is performed in a short PUCCH, a long PUCCH, or a PUSCH. For SP CSI in a short/long PUCCH, periodicity and a slot offset are configured by RRC and a CSI report is activated/deactivated by separate MAC CE/DCI. For SP CSI in a PUSCH, periodicity of SP CSI reporting is configured by RRC, but a slot offset is not configured by RRC and SP CSI reporting is activated/deactivated by DCI (format 0_1). For SP CSI reporting in a PUSCH, a separated RNTI (SP-CSI C-RNTI) is used. An initial CSI report timing follows a PUSCH time domain allocation value indicated by DCI and a subsequent CSI report timing follows a periodicity configured by RRC. DCI format 0_1 may include a CSI request field and activate/deactivate a specific configured SP-CSI trigger state. SP CSI reporting has activation/deactivation equal or similar to a mechanism having data transmission in a SPS PUSCH. iii) Aperiodic CSI reporting is performed in a PUSCH and is triggered by DCI. In this case, information related to trigger of aperiodic CSI reporting may be delivered/indicated/configured through MAC-CE. For AP CSI having an AP CSI-RS, AP CSI-RS timing is configured by RRC and timing for AP CSI reporting is dynamically controlled by DCI.

A CSI codebook (e.g., PMI codebook) defined in the NR specifications may be broadly classified into a Type I codebook and a Type II codebook. The Type I codebook mainly targets single user MIMO (SU-MIMO) that supports both a high order and a low order. The Type II codebook primarily supports multi-user MIMO (MU-MIMO), which is capable of handling a maximum of two layers. While the Type II codebook is capable of providing more accurate CSI compared to Type I, the Type II codebook may also increase signaling overhead. On the other hand, an Enhanced Type II codebook is introduced to address the CSI overhead issues associated with the existing Type II codebook. The Enhanced Type II codebook may reduce the payload of the codebook by considering the correlation in the frequency domain.

CSI reporting over a PUSCH may be configured as Part 1 and Part 2. Part 1 has a fixed payload size and is used to identify the number of information bits in Part 2. Part 1 is fully transmitted before Part 2.

- For the Type I CSI feedback, Part 1 includes an RI (if reported), a CRI (if reported), and the CQI of a first codeword. Part 2 includes a PMI, and when RI>4, Part 2 also includes the CQI.
- For the Type II CSI feedback, Part 1 includes an RI (if reported), a CQI, and an indication of the number of non-zero WB amplitude coefficients for each layer of Type II CSI. Part 2 includes the PMI of the Type II CSI.
- For the Enhanced Type II CSI feedback, Part 1 includes an RI (if reported), a CQI, and an indication of the total number of non-zero WB amplitude coefficients for all layers of Enhanced Type II CSI. Part 2 includes the PMI of the Enhanced Type II CSI.

For the PUSCH, CSI reporting includes two parts. If the CSI payload to be reported is smaller than a payload size provided by PUSCH resources allocated for CSI reporting, the UE may drop parts of the Part 2 CSI.

Semi-persistent CSI reporting performed with PUCCH format 3 or 4 supports Type II CSI feedback but supports only Part 1 of Type II CSI feedback.

Quasi-Co Location (QCL)

When the channel property of an antenna port is to be inferred from a channel of another antenna port, the two antenna ports are quasi co-located. The channel property may include one or more of delay spread, Doppler spread, frequency/Doppler shift, average received power, received Timing/average delay, and a spatial RX parameter.

A list of a plurality of TCI-state configurations may be configured in the UE through a higher layer parameter PDSCH-Config. Each TCI-state is linked to a QCL configuration parameter between one or two DL reference signals and the DM-RS port of a PDSCH. The QCL may include qcl-Type1 for a first DL RS and qcl-Type2 for a second DL RS. The QCL type may correspond to one of the following.

- 'QCL-TypeA': {Doppler shift, Doppler spread, average delay, delay spread}
- 'QCL-TypeB': {Doppler shift, Doppler spread}
- 'QCL-TypeC': {Doppler shift, average delay}
- 'QCL-TypeD': {Spatial Rx parameter}

Beam Management (BM)

The BM refers to a series of processes for acquiring and maintaining a set of BS beams (transmission and reception point (TRP) beams) and/or a set of UE beams available for DL and UL transmission/reception. The BM may include the following processes and terminology.

- Beam measurement: an operation by which the BS or UE measures the characteristics of a received beamformed signal

- Beam determination: an operation by which the BS or UE selects its Tx/Rx beams
- Beam sweeping: an operation of covering a spatial domain by using Tx and/or Rx beams for a prescribed time interval according to a predetermined method
- Beam report: an operation by which the UE reports information about a signal beamformed based on the beam measurement.

The BM procedure may be divided into (1) a DL BM procedure using an SSB or CSI-RS and (2) a UL BM procedure using an SRS. Further, each BM procedure may include Tx beam sweeping for determining a Tx beam, and Rx beam sweeping for determining an Rx beam.

The DL BM procedure may include (1) transmission of beamformed DL RSs (e.g., CSI-RS or SSB) from the BS and (2) beam reporting from the UE.

A beam report may include preferred DL RS ID(s) and reference signal received power(s) (RSRP(s)) corresponding to the preferred DL RS ID(s). A DL RS ID may be an SSB resource indicator (SSBRI) or a CSI-RS resource indicator (CRI).

Artificial Intelligence/Machine Learning (AI/ML)

With the technological development of AI/ML, node(s) and UE(s) constituting a wireless communication network are becoming intelligent/advanced, and in particular, due to intelligence of a network/BS, it is expected that various network/BS determination parameter values (e.g., transmission and reception power of each BS, transmission power of each UE, precoder/beam of BS/UE, time/frequency resource allocation for each UE, or a duplex method of BS) are rapidly optimized and derived/applied according to various environmental parameters (e.g., distribution/location of BSs, distribution/location/material of building/furniture, location/moving direction/speed of UEs, and climate information). In line with this trend, many standardization organizations (e.g., 3GPP or O-RAN) consider introduction of the network/BS determination parameter values, and research on this is also actively underway.

Figure 8:
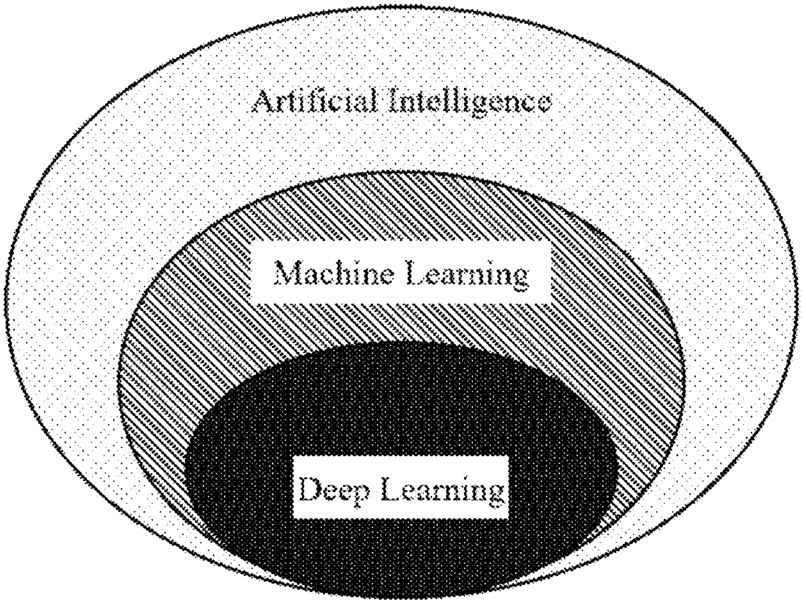
FIG. 8 is a view for explaining a concept of artificial intelligence/machine learning (AI/ML)/deep learning.

In a narrow sense, AI/ML may be easily referred to as deep learning-based artificial intelligence, but is conceptually shown in FIG. 8.

- Artificial intelligence: This may correspond to all automation by which machines replace a human work.
- Machine learning: Without explicitly programming rules, machines may learn patterns for decision-making on their own from data.
- Deep learning: This is an artificial neural network-based AI/ML model in which a machine performs all at once from unstructured data to feature extraction and determination and an algorithm depends upon a biological nervous system, that is, a multi-layer network of interconnected nodes for feature extraction and transformation inspired by a neural network. A common deep learning network architecture may include deep neural networks (DNNs), recurrent neural networks (RNNs) and convolutional neural networks (CNNs).

Classification of Types of AI/ML According to Various References

1. Offline Vs Online (1) Offline Learning: This complies with a sequential procedure of database collection, learning, and prediction. In other words, collection and learning are performed offline, and the completed program may be installed in the field and used for prediction. In most situations, this offline learning method is used. In offline learning, the system does not learn incrementally. Instead, learning is performed using all available collected data, and the results are applied without further learning. If learning on new data becomes necessary, learning may be initiated again using new complete data.

(2) Online Learning: Online learning is a method of improving performance little by little by incrementally learning with additionally generated data based on the fact that data to be used for learning is continuously generated recently through the Internet. Real-time learning is performed on specific units of data (batches) collected online, thereby allowing the system to quickly adapt to varying data.

To build an AI system, learning may be performed solely through online learning using only data generated in real-time. Alternatively, after conducting offline learning using a specific data set, additional learning may be performed using subsequently generated real-time data (online+offline learning).

2. Classification According to AI/ML Framework Concept (1) Centralized Learning: When training data collected from a plurality of different nodes is reported to a centralized node, all data resources/storage/learning (e.g., supervised, unsupervised, and reinforcement learning) are performed by one central node.

(2) Federated Learning: A collective AI/ML model is configured based on data across decentralized data owners. Instead of using data into an AI/ML model, a local node/individual device collects data and a train a copy of the AI/ML model thereof, and thus it is not required to report source data to a central node. In federated learning, a parameter/weight of the AI/ML model may be transmitted back to the centralized node to support general AI/ML model training. An advantage of federated learning includes increased computation speed and superiority in terms of information security. That is, a process of uploading personal data to a central server is unnecessary, and leakage and abuse of personal information may be prevented.

(3) Distributed Learning: The machine learning process represents a concept that is scaled and deployed across a cluster of nodes. A training AI/ML model is split and shared across multiple nodes operating concurrently to speed up AI/ML model training.

3. Classification According to Learning Method (1) Supervised Learning: Supervised learning is a machine learning task that aims to learn a mapping function from input to output when a labeled data set is given. The input data is called training data and has known labels or outcomes. An example of the supervised learning may include (i) Regression: Linear Regression, Logistic Regression, (ii) Instance-based Algorithms: k-Nearest Neighbor (KNN), (iii) Decision Tree Algorithms: CART, (iv) Support Vector Machines: SVM, (v) Bayesian Algorithms: Naive Bayes, and (vi) Ensemble Algorithms: Extreme Gradient Boosting, Bagging: Random Forest. The supervised learning may be further grouped due to regression and classification problems, and classification predicts a label and regression predicts a quantity.

(2) Unsupervised Learning: This is a machine learning task that aims to learn a function that describes a hidden structure in unlabeled data. Input data is unlabeled and has no known results. Some examples of unsupervised learning include K-means clustering, principal component analysis (PCA), nonlinear independent component analysis (ICA), and LSTM.

(3) Reinforcement Learning: In reinforcement learning (RL), an agent aims to optimize a long-term goal by interacting with an environment based on a trial-and-error process, which is goal-oriented learning based on an interaction with the environment. Examples of an RL algorithm may include (i) Q-learning, (ii) Multi-armed bandit learning, (iii)

Deep Q Network, State-Action-Reward-State-Action (SARSA), (iv) Temporal Difference Learning, (v) Actor-critic reinforcement learning, (vi) Deep deterministic policy gradient, and (vii) Monte-Carlo tree search. The RL may be further grouped into AI/ML model-based RL and AI/ML model-free RL. Model-based RL is an RL algorithm that uses a predictive AI/ML model to obtain transition probabilities between states using various dynamic states of the environment and an AI/ML model in which these states lead to rewards. Model-free RL is a value- or policy-based RL algorithm that achieves maximum future reward, which is less computationally complex in multi-agent environments/states and does not require accurate representation of the environment. The RL algorithm may also be classified into value-based RL versus policy-based RL, policy-based RL versus non-policy RL, and the like.

AI/ML Models

Figure 9:
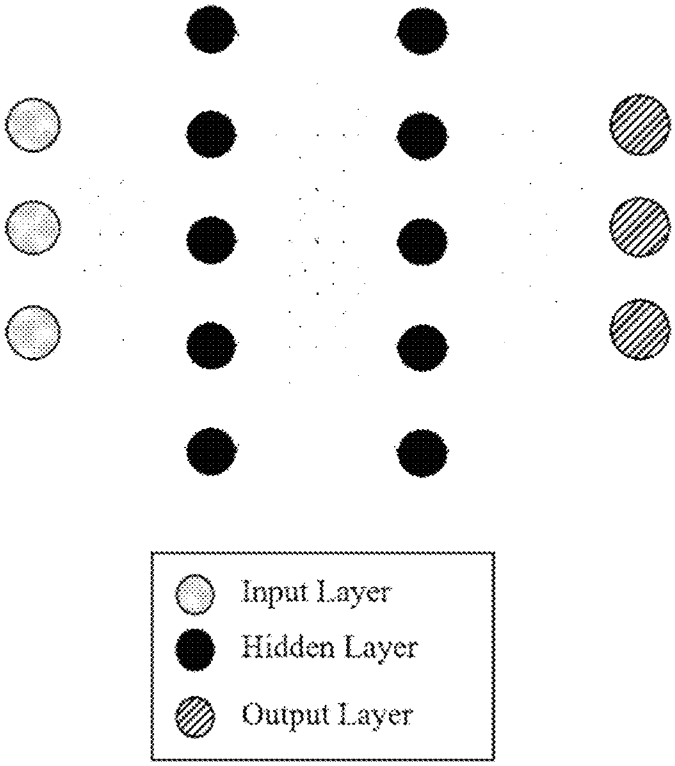
FIGS. 9 to 12 show various AI/ML models of deep learning.

FIG. 9 shows an example of a feed-forward neural network (FFNN) AI/ML model. Referring to FIG. 9, the FFNN AI/ML model includes an input layer, a hidden layer, and an output layer.

Figure 10:
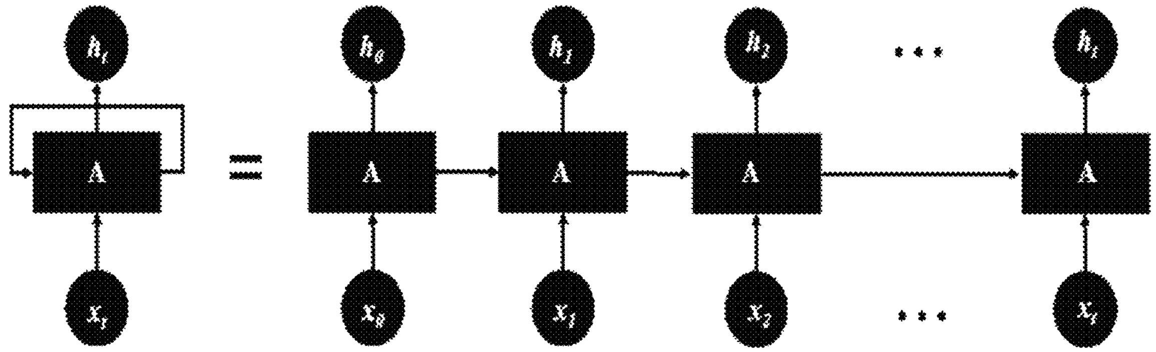

FIG. 10 shows an example of a recurrent neural network (RNN) AI/ML model. Referring to FIG. 10, the RNN AI/ML model is a type of artificial neural network in which a hidden node is connected to a directed edge to form a directed cycle and is an AI/ML model suitable for processing sequentially appearing data such as voice or text. One type of the RNN is a long short-term memory (LSTM), and the LSTM is a structure in which a cell-state is added to a hidden state of the RNN. In detail, in the LSTM, an input gate, a forget gate, and an output gate are added to the RNN cell, and a cell state is added. In Equation 10, A represents a neural network, $x_t$ denotes an input value, and $h_t$ denotes an output value. Here, $h_t$ may represent the current state value based on time, while $h_{t-1}$ may represent the previous state value.

Figure 11:
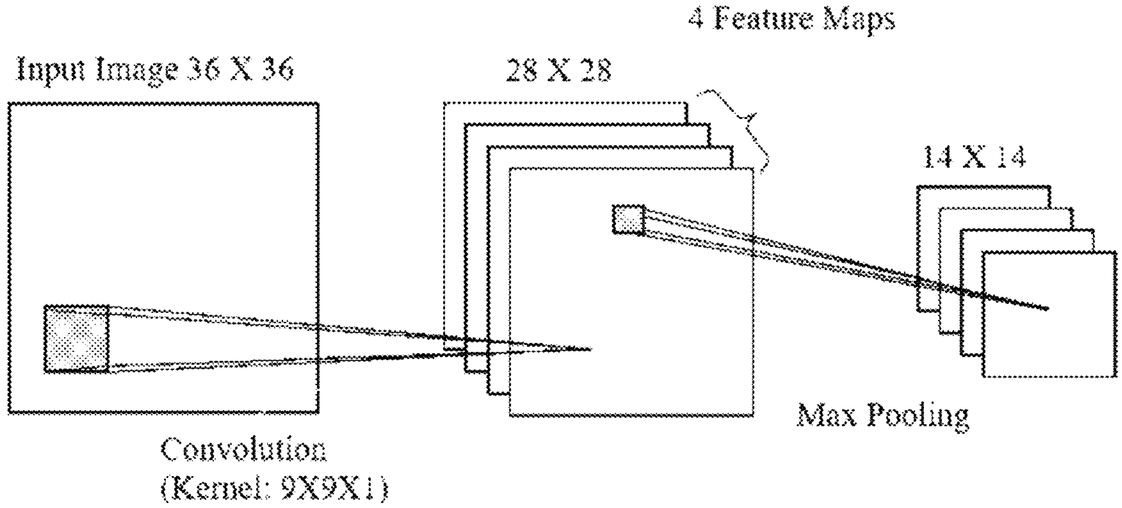

FIG. 11 shows a convolution neural network (CNN) AI/ML model. The CNN is used for two purposes including reduction in AI/ML model complexity and extraction of good features by applying convolution computation commonly used in a video processing or image processing field. Referring to FIG. 11, a kernel or a filter means a unit/structure that applies a weight to an input in a specific range/unit. The kernel (or filter) may be modified through learning. A stride is a movement range in which the kernel is moved within the input. A feature map is the result of applying a kernel to an input. Padding refers to a value added to adjust the size of the feature map. To encourage robustness against distortion and changes, multiple feature maps may be extracted. Pooling refers to computation (e.g., max pooling or average pooling) to reduce the size of the feature map by downsampling the feature map.

Figure 12:
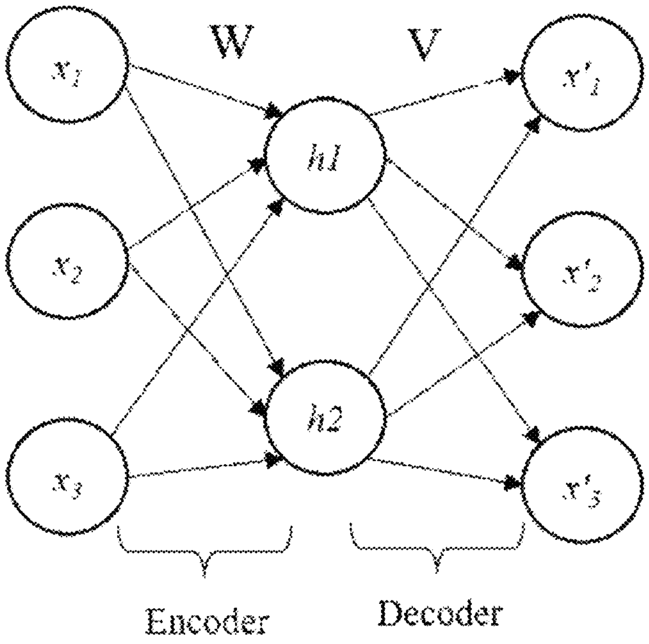

FIG. 12 shows an auto-encoder AI/ML model. Referring to FIG. 12, the auto-encoder is a neural network that receives a feature vector x and outputs the same or similar vector x' and a type of unsupervised learning with input and output nodes having the same feature. An autoencoder reconstructs the input, and thus, the output may be referred to as reconstruction. A loss function may be represented according to Equation 1 below.

$$\underset{W,V}{\operatorname{argmin}}\|x-g(f(x))\|^2, \text{ where } h=f(x)=Wx,\ x'=g(h)=Vh \quad \text{[Equation 1]}$$

In Equation 12, the loss function of the autoencoder is calculated based on the difference between the input and output. Based on the loss function of the autoencoder, the degree of loss in the input is assessed, and an optimization process is applied to the autoencoder to minimize the loss.

Figure 13:
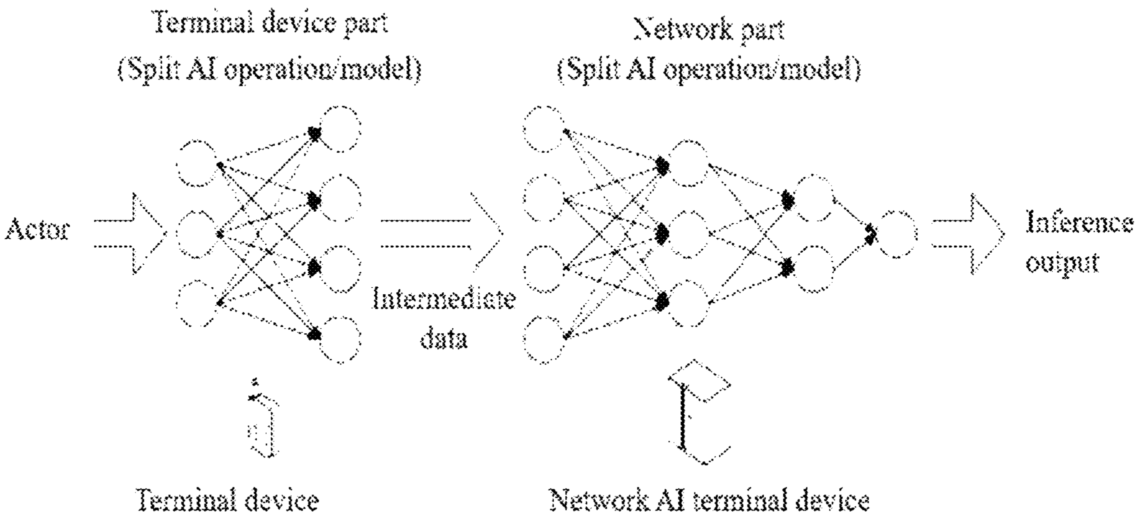
FIG. 13 is a diagram illustrating split AI inference.

FIG. 13 is a diagram illustrating split AI inference.

FIG. 13 illustrates a case where a model inference function is collaboratively performed between an end devices such as a UE and a network AI/ML endpoint during the split AI operation.

In addition to the model inference function, a model training function, actor, and data collection function may each be split into multiple parts based on the current task and environment. These functions may be executed through the collaboration of multiple entities.

For example, computation-intensive and energy-intensive parts may be performed at the network endpoint, while privacy-sensitive and latency-sensitive parts may be executed on the end device. In this case, the end device executes tasks/models up to a specific part/layer based on input data and then transmits intermediate data to the network endpoint. The network endpoint executes the remaining parts/layers and provides inference outputs to one or more devices performing the operations/tasks.

The following describes a functional framework for AI operations.

Herein, the following terms may be defined for more detailed explanation of AI (or AI/ML).

- Data collection: Data collected from network nodes, management entities, or UEs, which serves as the foundation for AI model training, data analysis, and inference.
- AI model: A data-driven algorithm where AI techniques are applied to generate a set of outputs, including predictive information and/or decision parameters, based on a set of inputs.
- AI/ML training: An online or offline process of training an AI model by learning features and patterns to best represent data and obtain an AI/ML model trained for inference.
- AI/ML inference: A process that uses a trained AI model to make predictions or derive decisions based on collected data and the AI model.

Figure 14:
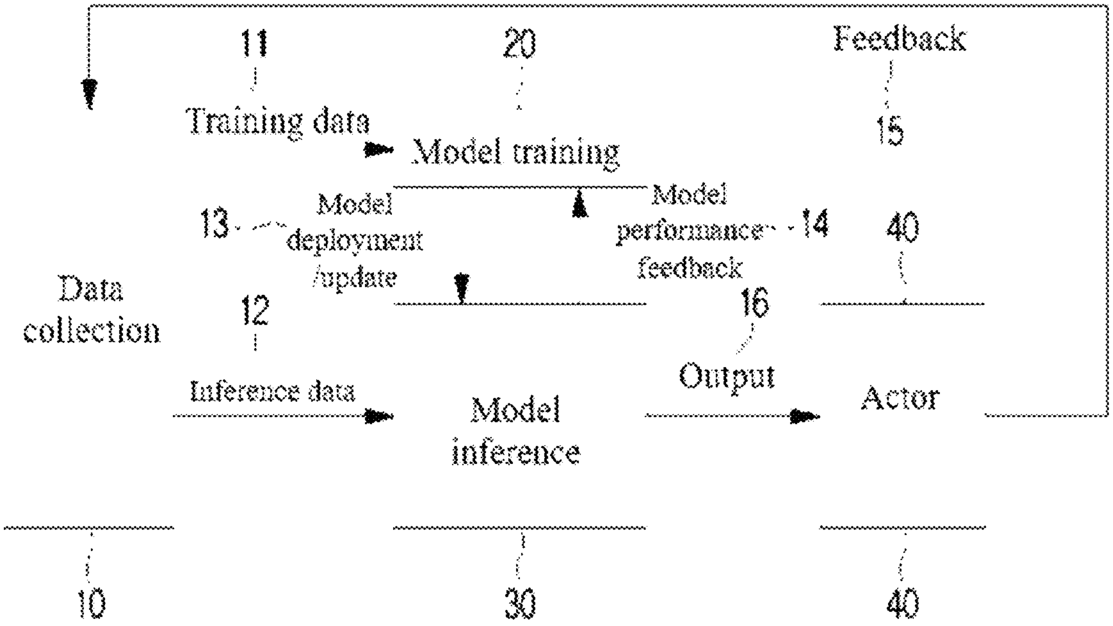
FIG. 14 is a diagram illustrating a framework for 3GPP radio access network (RAN) intelligence.

Referring to FIG. 14, a data collection function 10 collects input data and provides the processed input data to a model training function 20 and a model inference function 30.

For example, the input data may include measurements from UEs or other network entities, feedback from actors, and outputs from AI models.

The data collection function 10 performs data preparation based on the input data and provides the input data processed through the data preparation. Here, the data collection function 10 does not performs specific data preparation (e.g., data pre-processing and cleaning, forming, and transformation) for each AI algorithm, but the data collection function 10 may perform data preparation common to AI algorithms.

After completing the data preparation process, the data collection function 10 provides training data 11 to the model training function 20 and provides inference data 12 to the model inference function 30. Here, the training data 11 is input data required for the AI model training function 20. The inference data 12 is input data required for the AI model inference function 30.

The data collection function 10 may be performed by a single entity (e.g., UE, RAN node, network node, etc.) or by multiple entities. In this case, the training data 11 and inference data 12 may be provided to the model training function 20 and model inference function 30 respectively from multiple entities.

As part of the AI model testing procedure, the model training function 20 is responsible for performing AI model training, validation, and testing necessary to generate model performance metrics. If necessary, the model training function 20 may handle data preparation (e.g., data pre-processing and cleaning, forming, and transformation) based on the training data 11 provided by the data collection function 10.

Here, a model deployment/update 13 is used to initially deploy the trained, validated, and tested AI model to the model inference function 30 or to provide the updated model to the model inference function 30.

The model inference function 30 is responsible for providing an AI model inference output 16 (e.g., predictions or decisions). If applicable, the model inference function 30 may also provide model performance feedback 14 to the model training function 20. Additionally, the model inference function 30 may handle data preparation (e.g., data pre-processing and cleaning, forming, and transformation) based on the inference data 12 provided by the data collection function 10 if necessary.

Here, the output 16 refers to the inference output of the AI model generated by the model inference function 30, and the details of the inference output may vary depending on the use case.

The model performance feedback 14 may be used to monitor the performance of the AI model when available. However, the feedback may be omitted.

An actor function 40 receives the output 16 from the model inference function 30 and triggers or performs related tasks/operations. The actor function 40 may trigger tasks/operations for other entities (e.g., one or more UEs, one or more RAN nodes, one or more network nodes, etc.) or for itself.

Feedback 15 may be used to derive the training data 11 and inference data 12 or to monitor the performance of the AI model, the impact on the network, and so on.

The definitions of training, validation, and testing in a data set used in AI/ML may be distinguished as follows:

- Training data: The training data refers to a data set used for training a model.
- Validation data: The validation data refers to a data set used to validate a model that has already been trained. In other words, the validation data means a data set used to prevent overfitting of a typical training data set.

Additionally, the validation data refers to a data set used to select the best model among several trained models during the training process. Thus, the validation data may also be considered a type of learning.

- Test data: The test data refers to a data set used for final evaluation. The test data is independent of training.

In the case of the aforementioned data set, it is common to split a training set such that the training data and validation data are divided in a ratio of 8:2 or 7:3. When the test data is included, the training data, validation data, and test data may be divided in a ratio of 6:2:2 (training: validation: test).

Collaboration levels may be defined as follows, depending on the capability of the AI/ML functions between the BS and UE. It is also possible to combine multiple levels or to modify the levels by separating any one level.

Cat 0a) No Collaboration Framework: AI/ML algorithms are purely implementation-based and do not require changes to a wireless interface.

Cat 0b) This level involves a modified wireless interface suitable for efficient implementation-based AI/ML algorithms, but the level corresponds to a framework without collaboration.

Cat 1) Support between nodes is provided to enhance the AI/ML algorithm of each node. This level is applied when the UE receives support from the gNB (for training, adaptation, etc.), and vice versa. At this level, model exchange between network nodes is not required.

Cat 2) Collaborative ML tasks may be performed between the UE and gNB. This level requires the exchange of AI/ML model commands between network nodes.

The functions illustrated in FIG. 14 may be implemented in RAN nodes (e.g., BSs, TRPs, central units (CUs) of BSs), network nodes, operation administration maintenance (OAM) of network operators, or UEs.

Alternatively, two or more entities among the RAN nodes, network nodes, OAM of network operators, or UEs may collaborate to implement the functions illustrated in FIG. 14. For example, one entity may perform some of the functions in FIG. 14, while another entity may perform the remaining functions. In this way, if some of the functions illustrated in FIG. 14 are performed by a single entity (e.g., a UE, RAN node, or network node), the transfer/provision of data/information between individual functions may be omitted. For instance, if the model training function 20 and model inference function 30 are performed by the same entity, the transfer/provision of the model deployment/update 13 and model performance feedback 14 may be omitted.

Alternatively, any one of the functions illustrated in FIG. 14 may be performed through collaboration between two or more entities among the RAN nodes, network nodes, OAM of network operators, or UEs. This may be referred to as the split AI operation.

Figure 15:
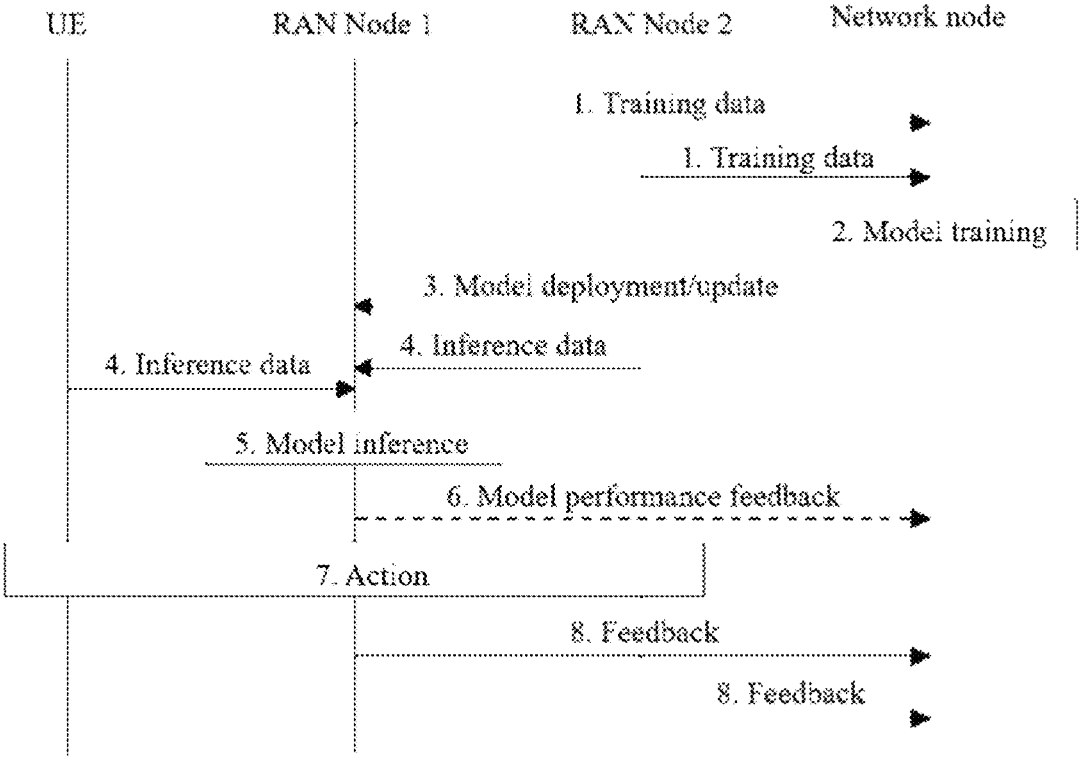
FIGS. 15 to 17 illustrate AI model training and inference environments.

FIG. 15 illustrates a scenario where the AI model training function is performed by a network node (e.g., a core network node, OAM of a network operator, etc.), while the AI model inference function is performed by RAN nodes (e.g., BSs, TRPs, or CUs of BSs).

Step 1: RAN node 1 and RAN node 2 transmit input data for AI model training (i.e., training data) to the network node. Here, RAN node 1 and RAN node 2 may transmit data collected from a UE (e.g., UE measurements related to the RSRP, RSRQ, or SINR of serving and neighboring cells, UE location, speed, etc.) to the network node.

Step 2: The network node trains an AI model using the received training data.

Step 3: The network node deploys/updates the AI model to RAN node 1 and/or RAN node 2. RAN node 1 (and/or RAN node 2) may continue to perform model training based on the received AI model.

For the sake of convenience in explanation, it is assumed that the AI model is deployed/updated only to RAN node 1.

Step 4: RAN node 1 receives input data for AI model inference (i.e., inference data) from the UE and RAN node 2.

Step 5: RAN node 1 performs the AI model inference using the received inference data to generate output data (e.g., predictions or decisions).

Step 6: If applicable, RAN node 1 may transmit model performance feedback to the network node.

Step 7: RAN node 1, RAN node 2, and the UE (or RAN node 1 and UE, or RAN node 1 and RAN node 2) perform actions based on the output data. For example, in the case of a load balancing operation, the UE may move from RAN node 1 to RAN node 2.

Step 8: RAN node 1 and RAN node 2 transmit feedback information to the network node.

Figure 16:
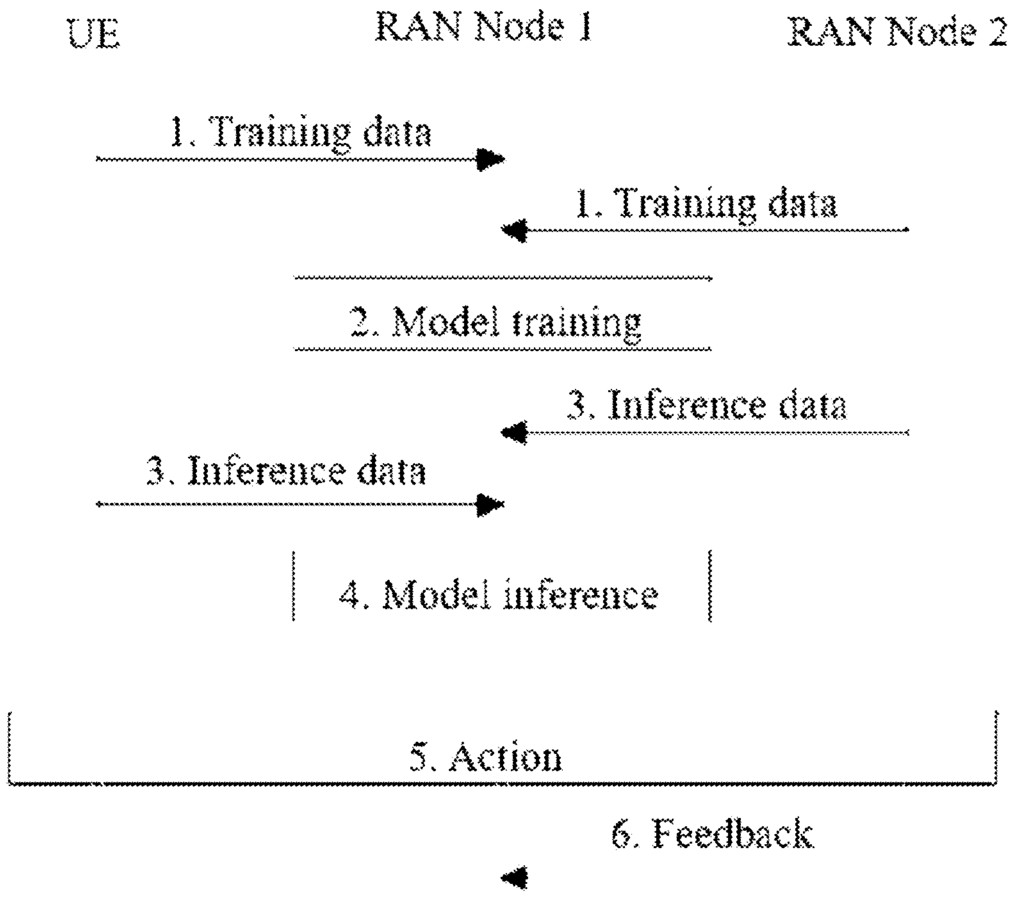

FIG. 16 illustrates a scenario where both the AI model training function and the AI model inference function are performed by RAN nodes (e.g., BSs, TRPs, or CUs of BSs).

Step 1: A UE and RAN node 2 transmit input data for AI model training (i.e., training data) to RAN node 1.

Step 2: RAN node 1 trains an AI model using the received training data.

Step 3: RAN node 1 receives input data for AI model inference (i.e., inference data) from the UE and RAN node 2.

Step 4: RAN node 1 performs the AI model inference using the received inference data to generate output data (e.g., predictions or decisions).

Step 5: RAN node 1, RAN node 2, and the UE (or RAN node 1 and UE, or RAN node 1 and RAN node 2) perform actions based on the output data. For example, in the case of a load balancing operation, the UE may move from RAN node 1 to RAN node 2.

Step 6: RAN node 2 transmits feedback information to RAN node 1.

Figure 17:
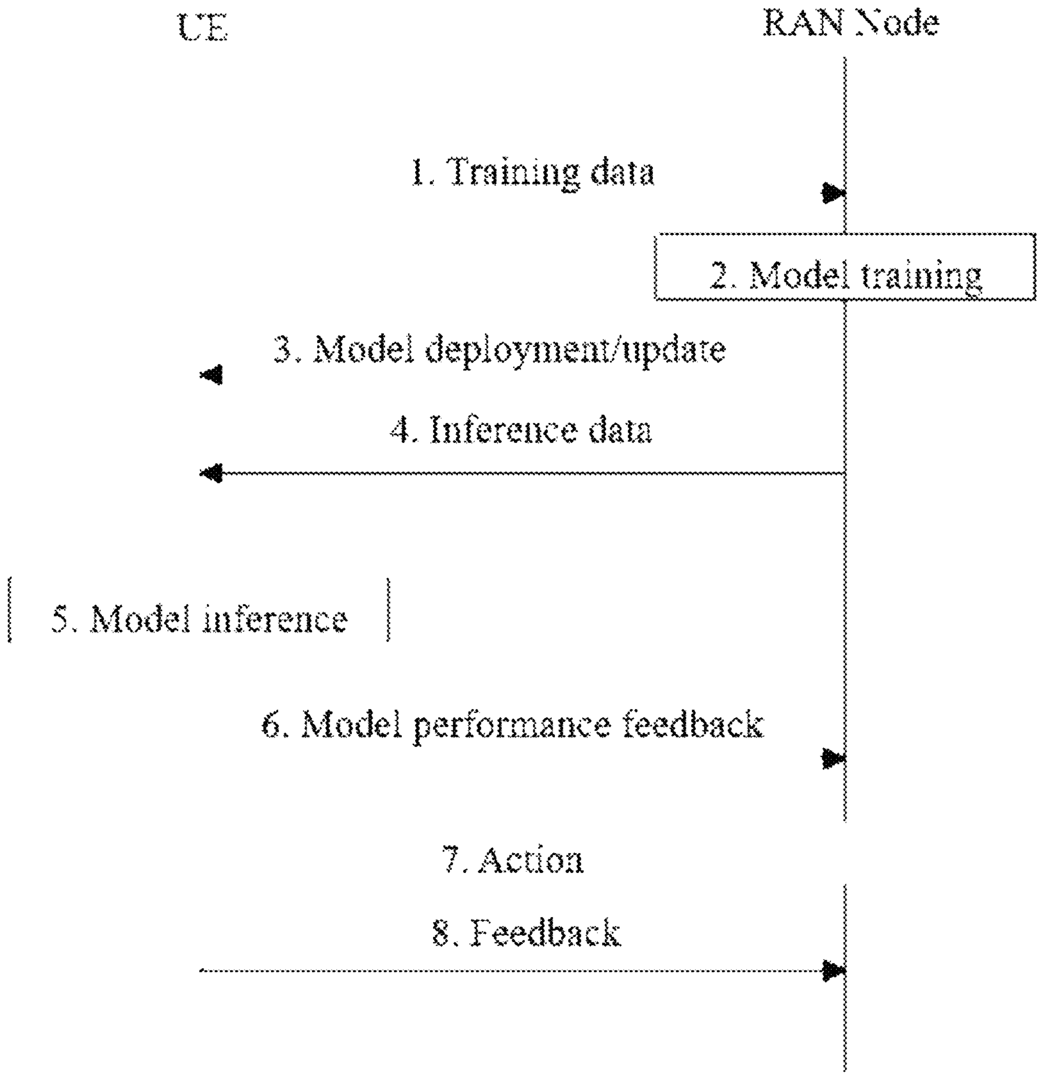

FIG. 17 illustrates a scenario where the AI model training function is performed by a RAN node (e.g., a BS, a TRP, or CUs of the BS), while the AI model inference function is performed by a UE.

Step 1: The UE transmits input data for AI model training (i.e., training data) to the RAN node. Here, the RAN node may collect data from various UEs and/or other RAN nodes (e.g., UE measurements related to the RSRP, RSRQ, or SINR of serving and neighboring cells, UE location, speed, etc.).

Step 2: The RAN node trains an AI model using the received training data.

Step 3: The RAN node deploys/updates the AI model to the UE. The UE may continue to perform model training based on the received AI model.

Step 4: The UE receives input data for AI model inference (i.e., inference data) from the RAN node (and/or from other UEs).

Step 5: The UE performs the AI model inference using the received inference data to generate output data (e.g., predictions or decisions).

Step 6: If applicable, the UE may transmit model performance feedback to the RAN node.

Step 7: The UE and RAN node perform actions based on the output data.

Step 8: The UE transmits feedback information to the RAN node.

AI/ML Model Management

With the advancement of computing technologies and AI/ML technologies, nodes and UEs included in a wireless communication network are becoming more intelligent and sophisticated. In particular, due to the intelligence of the network, it is expected that various network decision parameter values (e.g., transmission and reception power of each BS, transmission power of each UE, precoders/beams for each BS/UE, time/frequency resource allocation for each UE, duplex modes of each BS, etc.) may be quickly optimized and applied based on various network environmental parameters (e.g., distribution/location of BSs, distribution/location/material of buildings/furniture, location/movement direction/speed of UEs, climate information, etc.).

As described above, when a network or BS with the AI technology applied or a network/BS with advanced performance achieved through other means is implemented, it is expected that integrated control and/or real-time cooperation between BSs will enable dynamic optimization for interference and traffic. The present disclosure proposes methods for effective management of AI/ML when multiple networks/BSs perform cooperative communication based on AI/ML within the context of an evolved network/BS.

In the following embodiments, each TRP/RRH (remote radio head) may be explicitly distinguished by a TRP ID or may be identified through the following index.

Each TRP may be distinguished by a CSI-RS resource ID (and/or sequence ID), a cell ID, CORESETPoolIndex, or a (SSB) beam index (or TCI states index) in CSI-ResourceConfig. For each TRP, an AI/ML model (pair) ID and/or functionality ID may also be distinguished. The IDs can be configured, indicated, or differentiated in relation to the CSI-RS resource ID (and/or sequence ID), cell ID, CORESETPoolIndex, or (SSB) beam index (or TCI states index).

In particular, for multi-TRP (MTRP) CSI feedback, one or more AI/ML model (pair) IDs and/or one or more functionality IDs are configured within a specific set (e.g., CSI-RS resource set or AI/ML function set). The BS may order the AI/ML model IDs and/or functionality IDs per TRP based on a specific index and configure the application order of the corresponding models/functions. Alternatively, implicit ordering may be performed based on the aforementioned CSI-RS ID, cell ID, CORESETPoolIndex, or TCI state index.

To effectively control interference and increase yield, cooperative transmission by multiple TRPs has been introduced in Rel-16/17. In the MTRP environment, non-coherent joint transmission (JT) is supported, which does not guarantee coherency for each TRP, and techniques for coherent transmission between TRPs are currently under discussion in Rel-18. The present disclosure proposes methods for effectively managing AI/ML (e.g., model management or lifecycle management) when the AI/ML is introduced in the MTRP environment.

Generally, managing an AI/ML model by repetitively performing some or all of the following processes: data collection, model training, model deployment, model inference, model monitoring, and model updating is referred to as AI/ML lifecycle management.

Table 7 shows the terms related to AI/ML models used in standardization.

TABLE 7

| Terminology | Description |
|---|---|
| Data collection | A process of collecting data by the network nodes, management entity, or UE for the purpose of AI/ML model training, data analytics and inference |
| AI/ML Model | A data driven algorithm that applies AI/ML techniques to generate a set of outputs based on a set of inputs. |
| AI/ML model training | A process to train an AI/ML Model [by learning the input/output relationship] in a data driven manner and obtain the trained AI/ML Model for inference |

TABLE 7-continued

| Terminology | Description |
|---|---|
| AI/ML model Inference | A process of using a trained AI/ML model to produce a set of outputs based on a set of inputs |
| AI/ML model validation | A subprocess of training, to evaluate the quality of an AI/ML model using a data set different from one used for model training, that helps selecting model parameters that generalize beyond the data set used for model training. |
| AI/ML model testing | A subprocess of training, to evaluate the performance of a final AI/ML model using a data set different from one used for model training and validation. Differently from AI/ML model validation, testing does not assume subsequent tuning of the model. |
| UE-side (AI/ML) model | An AI/ML Model whose inference is performed entirely at the UE |
| Network-side (AI/ML) model | An AI/ML Model whose inference is performed entirely at the network |
| One-sided (AI/ML) model | A UE-side (AI/ML) model or a Network-side (AI/ML) model |
| Two-sided (AI/ML) model | A paired AI/ML Model(s) over which joint inference is performed, where joint inference comprises AI/ML Inference whose inference is performed jointly across the UE and the network, i.e, the first part of inference is firstly performed by UE and then the remaining part is performed by gNB, or vice versa. |
| AI/ML model transfer | Delivery of an AI/ML model over the air interface, either parameters of a model structure known at the receiving end or a new model with parameters. Delivery may contain a full model or a partial model. |
| Model download | Model transfer from the network to UE |
| Model upload | Model transfer from UE to the network |
| Federated learning/ federated training | A machine learning technique that trains an AI/ML model across multiple decentralized edge nodes (e.g., UEs, gNBs) each performing local model training using local data samples. The technique requires multiple interactions of the model, but no exchange of local data samples. |
| Offline field data | The data collected from field and used for offline training of the AI/ML model |
| Online field data | The data collected from field and used for online training of the AI/ML model |
| Model monitoring | A procedure that monitors the inference performance of the AI/ML model |
| Supervised learning | A process of training a model from input and its corresponding labels. |
| Unsupervised learning | A process of training a model without labelled data. |
| Semi-supervised learning | A process of training a model with a mix of labelled data and unlabelled data |
| Reinforcement Learning (RL) | A process of training an AI/ML model from input (a.k.a. state) and a feedback signal (a.k.a. reward) resulting from the model's output (a.k.a. action) in an environment the model is interacting with. |
| Model activation | Enable an AI/ML model for a specific AI/ML-enabled feature |
| Model deactivation | Disable an AI/ML model for a specific AI/ML-enabled feature |
| Model switching | Deactivating a currently active AI/ML model and activating a different AI/ML model for a specific AI/ML-enabled feature |
| Model selection | The process of selecting an AI/ML model for activation among multiple models for the same AI/ML enabled feature. Note: Model selection may or may not be carried out simultaneously with model activation |

Table 8 shows the standardization agreements related to AI/ML models.

TABLE 8

| |
|---|
| For AI/ML functionality identification and functionality-based LCM of UE-side models and/or UE-part of two-sided models: |
| Functionality refers to an AI/ML-enabled Feature/FG enabled by configuration(s), where configuration(s) is(are) supported based on conditions indicated by UE capability. |
| Correspondingly, functionality-based LCM operates based on, at least, one configuration of AI/ML-enabled Feature/FG or specific configurations of an AI/ML-enabled Feature/FG. |
| FFS: Signaling to support functionality-based LCM operations, e.g., to activate/deactivate/fallback/switch AI/ML functionalities |
| FFS: Whether/how to address additional conditions (e.g., scenarios, sites, and data sets) to aid UE-side transparent model operations (without model identification) at the Functionality level |
| FFS: Other aspects that may constitute Functionality |
| FFS: which aspects should be specified as conditions of a Feature/FG available for functionality will be discussed in each sub-use-case agenda. |

TABLE 8-continued

| |
|---|
| For AI/ML model identification and model-ID-based LCM of UE-side models and/or UE-part of two-sided models: |
| model-ID-based LCM operates based on identified models, where a model may be associated with specific configurations/conditions associated with UE capability of an AI/ML-enabled Feature/FG and additional conditions (e.g., scenarios, sites, and data sets) as determined/identified between UE-side and NW-side. |
| FFS: Which aspects should be considered as additional conditions, and how to include them into model description information during model identification will be discussed in each sub-use-case agenda. |
| FFS: Relationship between functionality and model, e.g., whether a model may be identified referring to functionality(s). |
| FFS: relationship between functionality-based LCM and model-ID-based LCM |
| Note: Applicability of functionality-based LCM and model-ID-based LCM is a separate discussion. |

Proposal 1: In MTRP Transmission/Reception, if a Network and/or UE has a Capability for AI/ML Training and/or Inference, Management Related to AI/ML is Performed for Each TRP, and Signaling Regarding AI/ML Model Management (Updating, Activation, Deactivation, Switching, Etc.) is Indicated for Each TRP.

In Proposal 1, when AI/ML is applied to MTRP transmission/reception (Tx/Rx), AI/ML model management may vary depending on the applied AI/ML algorithm. For example, there may be a representative node or server (separate from nodes). The representative node or server may perform training of AI/ML models of all nodes on behalf of the nodes and handle transmission of AI/ML model inference/updates to each node. In contrast, in the case of distributed algorithms/federated learning, each node may perform training and/or inference of its own algorithm. Additionally, each node may exchange side information (other than input data) for training and/or model fine-tuning. The aforementioned side information may vary depending on cases where the AI/ML model is applied. Typically, the side information may represent the values of the loss function and/or utility function of each node (e.g., mean squared error (MSE), spectral efficiency (SE)). To facilitate AI/ML model management, an AI/ML model ID may be introduced. For each AI/ML model ID, AI/ML algorithms, model parameterization, input/output data, cooperation levels (e.g., one-sided AI/ML or two or more-sided AI/ML), loss functions, and AI/ML model usage (e.g., CSI feedback, positioning, beam prediction) may be distinguished and indicated.

The examples of AI/ML model usage include CSI reporting, beam management, resource allocation, scheduling, and positioning. Depending on the examples, the configuration of the AI/ML model (e.g., algorithm, model size/parameter, cost function, input/output data) may vary. CSI may be reported to the BS by measuring a CSI-RS through the auto-encoder illustrated in FIG. 12 and encoding the CSI-RS based on AI/ML. The BS may decode the CSI-RS and retrieve the CSI. Alternatively, the BS may set fewer ports but predict full CSI through AI/ML (for example, using an 8-port CSI-RS to measure a 16-port CSI-RS). The BS may predict future CSI based on multiple past CSI-RS measurement samples. The aforementioned examples primarily focus on single-TRP (STRP) scenarios. However, for MTRP scenarios, there may be cases where AI/ML is applied individually for each TRP by extending the STRP and cases where a central node trains and manages the AI/ML models for all nodes engaged in cooperative transmission as in the centralized system.

Proposal 2: For the Activation, Deactivation, Switching, and/or Updating of AI/ML Models Mentioned in Proposal 1, the Following Signaling is Proposed.

Alt 1: AI/ML model activation, deactivation, switching, and/or updating based on a MAC control element (CE).

Alt 2: AI/ML model activation, deactivation, switching, and/or updating based on DCI.

Alt 3: AI/ML model activation, deactivation, switching, and/or updating based on a timer.

In Proposal 2, it is assumed that the UE has an AI/ML capability (e.g., training and/or inference). For example, it is assumed that the UE receives configuration information on an AI/ML model related to CSI feedback from the BS and receives signaling/download for model deployment signaling or trained model parameters from the BS or AI/ML server. In this case, the AI/ML model may be considered to be activated upon the completion of receiving the signaling or after X milliseconds (or slots or symbols) from the completion of the reception. However, since applying the AI/ML model may be more effective depending on the scheduling objectives of the BS, it is proposed that the BS provides (dynamic) activation/deactivation signaling. In the case of Alt 1: MAC-CE based activation/deactivation, the AI/ML model indicated by the MAC-CE is activated by a MAC-CE activation command. Here, the meaning of AI/ML model activation is that actions based on existing legacy operations for the corresponding usage are disabled, while actions based on AI/ML are enabled. Examples of the usage may follow the contents of Proposal 1. One or multiple AI/ML models may be activated or deactivated based on the MAC-CE. Alternatively, specific functions may be defined for specific configurations, and only the corresponding parts may be enabled or disabled. For example, a function that determines the Line of Sight/Non-Line of Sight (LoS/NLoS) of a specific signal, which may be utilized in positioning techniques such as TDOA (Time Difference of Arrival) and multi-RTT (Round Trip Time), may be configured based on AI/ML, and the function may be activated or deactivated. In the case of deactivation, a quick fallback operation may be indicated through a command that deactivates all activated AI/ML models at once. In the case of Alt 1, the time of applying AI/ML model activation/deactivation may be assumed to be after X milliseconds (or slots/symbols) (where $X \geq 0$) from the time of receiving the MAC-CE command. Alternatively, it is assumed that a waveform is applied after Y milliseconds (or slots/symbols) (where $Y \geq 0$) from slot m for ACK transmission for the received MAC-CE (activation/deactivation/switching) command.

Alt 2 is a DCI-based activation/deactivation/switching method. In the case of DCI-based activation/deactivation/switching, similar to BWP switching, a specific field is defined within the DCI, and the defined field indicates the activation, deactivation, or switching of a specific AI/ML model. For example, a 1-bit field may be newly introduced.

The field may indicate the activation of a specific AI/ML model or the deactivation of an activated AI/ML model. Alternatively, the field may indicate switching of the AI/ML model. Another example is that specific AI/ML model(s) may be associated (in advance) with a specific BWP, or the association may be configured by the BS using RRC or other methods. Accordingly, the activation/deactivation or switching of the AI/ML model may be performed based on the existing BWP switching. For example, if AI/ML model 1 is configured for BWP1 and AI/ML model 2 is set for BWP2, and if the active BWP changes from 1 to 2, the UE may understand that AI/ML model 1 is deactivated (or suspended) and AI/ML model 2 is activated. Alternatively, it may be interpreted as the AI/ML model switching from 1 to 2. More specifically, when non-fallback DCI (e.g., DCI formats other than DCI format 0_0 or 1_0) is scheduled, the field becomes valid, and thus the activation/deactivation or switching may be performed. When fallback DCI is scheduled, it is considered that all AI/ML-based operations are disabled. During the process of performing activation/deactivation/switching of the AI/ML model based on the aforementioned BWP switching, if the training/updating of a specific AI/ML model associated with a dynamically switched BWP is not completed, the activation/deactivation/switching of the specific AI/ML model may not operate correctly. For example, it is assumed that the BS indicates BWP switching, but the UE is currently updating the AI/ML model or determines that the current AI/ML model is outdated. In this case, a switching gap may be introduced during the BWP switching time. Alternatively, immediately after the BWP switching, the UE may be instructed/configured to report whether switching to the AI/ML model of the corresponding BWP is performed. If not, the UE may be instructed/configured to report when the switching is completed. The time information may be reported based on UE capabilities or for each specific AI/ML model number or ID. Alternatively, the maximum value among multiple models may be reported as the time information. Additionally, before the BWP command, the BS may indicate/configure to the UE early training/updating/deployment of the AI/ML model associated with the target BWP rather than the currently active BWP. The BS may indicate/configure BWP switching to the UE by considering the aforementioned factors, which aims for fast BWP switching and fast model switching or activation.

In Alt 3, the activation time of a specific AI/ML model may be predefined or configured by the BS. As another example, it may operate based on a timer. For example, upon receiving the activation command (DCI or MAC-CE) for a specific AI/ML model, the timer may (re) start. If the UE receives separate signaling before the timer expires, the timer may restart again. If the UE does not receive any separate signaling before the timer expires, the UE may perform fallback operations (e.g., legacy or non-AI/ML-based operations) or may consider that the AI/ML model is deactivated.

In Alt 2 and/or Alt 3, when activation/deactivation is applied based on DCI, the UE may transmit an ACK for a change indicator to the BS such that the BS is capable of checking whether the UE correctly applies the AI/ML model and/or indicator. To facilitate this operation, an AI/ML-specific BWP may be defined separately. The difference between AI/ML-specific BWP switching and existing BWP switching may include examples where the frequency location and bandwidth are the same, but the BWP switching gap is defined differently.

The AI/ML model may operate in a data-driven manner. This means that if the statistics of data change, new operations such as retuning or retraining may be necessary. Thus, when the statistics of the input data used for AI/ML model training/retuning fluctuate, operations such as switching or deactivation of the model may be required. When the UE measures, applies, and/or reports input data related to a specific AI/ML model, the UE may request the BS for activation, deactivation, switching, or updating of the specific AI/ML model. For example, if the statistics (e.g., the mean or variance of a channel matrix) of CSI change in the AI/ML model related to CSI feedback, the UE may report measurement values or changes in the measurements to the BS to enable the BS to indicate the activation, deactivation, switching, or updating of the AI/ML model. Alternatively, as mentioned above, the UE may send a request for the operation to the BS. In the case of AI/ML model updating or fine-tuning, the BS may perform the operations aperiodically. Alternatively, for periodic/quasi-periodic management, the BS may configure a period/offset and perform the AI/ML model updating or fine-tuning.

When the UE makes a request for activation, deactivation, switching, or updating, reporting may be determined in an event-triggered manner. That is, the reporting is determined based on values configured according to a specific threshold defined by the BS. Alternatively, for a network-triggered operation, the UE may periodically or quasi-periodically report the statistics (e.g., the mean or variance of a channel matrix) related to the measurement/observation of a specific AI/ML model. Alternatively, the UE may directly determine whether to activate, deactivate, switch, or update the AI/ML model and notify the BS of the determination. In this case, the BS may discard values prior to the activation, deactivation, switching, or updating of the AI/ML model and use only the subsequent values for scheduling.

As another example, a method of associating the activation/deactivation/switching period of an AI/ML model with a specific (periodic/semi-persistent) beam/CSI reporting configuration (e.g., CSI-ReportConfig). Alternatively, the period may be configured/indicated as an integer multiple, thereby allowing for more flexible control. For example, if AI/ML-based beam reporting/CSI reporting is performed and the quantity (e.g., AI/ML specific reporting quantity) of the reporting is defined, the BS (or management server) and UE may mutually understand whether to switch, update, or deactivate the AI/ML model based on the value (or a specific threshold). Alternatively, similar to the aforementioned methods, the BS (or management server) and UE may mutually understand whether to switch, update, or deactivate the AI/ML model based on a specific CSI reporting quantity (e.g., RI/CQI/PMI) or a threshold. Alternatively, for a specific periodic/semi-persistent beam/CSI reporting configuration corresponding to the period for updating, switching, or activation/deactivation of the AI/ML model, the BS may indicate the updating, switching, or activation/deactivation through RRC, a MAC-CE, or DCI, depending on changes in the channel statistics (e.g., variance or mean) of a wireless channel in the time, frequency, and/or spatial domain.

In this case, if the BS fails to detect or receive the reporting from the UE, ambiguity may arise between the UE and BS (or management server). When periodic/semi-persistent reporting is performed over a PUSCH, the PUSCH may be scheduled in a way similar to a beam failure request response in beam failure recovery where new data indicator (NDI) toggling is performed with the same ID as a HARQ process ID related to a reporting PUSCH, thereby transmitting an ACK for beam/CSI reporting.

During a process of performing activation, deactivation, or switching of an AI/ML model based on BWP switching, it is necessary to define an operation method if the model training for the dynamically switched BWP is not fully completed. For example, if the BS indicates BWP switching, but if the UE is currently updating the AI/ML model or determines that the current AI/ML model is outdated, the BWP switching time may need to be relaxed. Alternatively, immediately after the BWP switching, the UE may report whether switching to the AI/ML model of the corresponding BWP is performed. If not, the UE may report when the switching is completed.

Proposal 3: For Smooth Handover or Radio Resource Management (RRM), Information on AI/ML Model/Functionality IDs for Target and/or Neighboring Cells May be Configured and Indicated.

When the UE is operating based on specific AI/ML-based usage, information on an AI/ML model (e.g., list, model number, ID, parameterization) supported/applied to a target cell may be configured and indicated for fast handover (HO) or RRM. This is to reduce latency during the HO or ensure the smooth execution of AI/ML model training/inference during the HO. To this end, information on additional model data for the target/neighboring cell may be downloaded or signaled in advance. Moreover, source and target cells may exchange the AI/ML model information applicable to the specific UE via the X2 interface. Since providing detailed information on various AI/ML models may be redundant, the AI/ML information may be exchanged by defining model numbers and/or versions (e.g., type, parameters). Proposal 3 may be implemented by providing the model numbers. Since the used or supported AI/ML models may vary depending on the communication operator or vendor, the UE may report whether to support a specific model as a UE capability. Alternatively, information on whether a specific AI/ML model is capable of being used by different operators/vendors (e.g., compatibility) may be indicated together.

As described above, when a network/BS with the AI technology applied or a network/BS with advanced performance achieved (through other means) is implemented, it is expected that integrated control and/or real-time cooperation between BSs will enable dynamic optimization for interference and traffic. The present disclosure proposes a resource control and CSI-related signaling method suitable for the above purpose. While the present disclosure is described based on the 3GPP NR system within the current system architecture, it is evident that the disclosure is also applicable to other communication systems.

Figure 18:
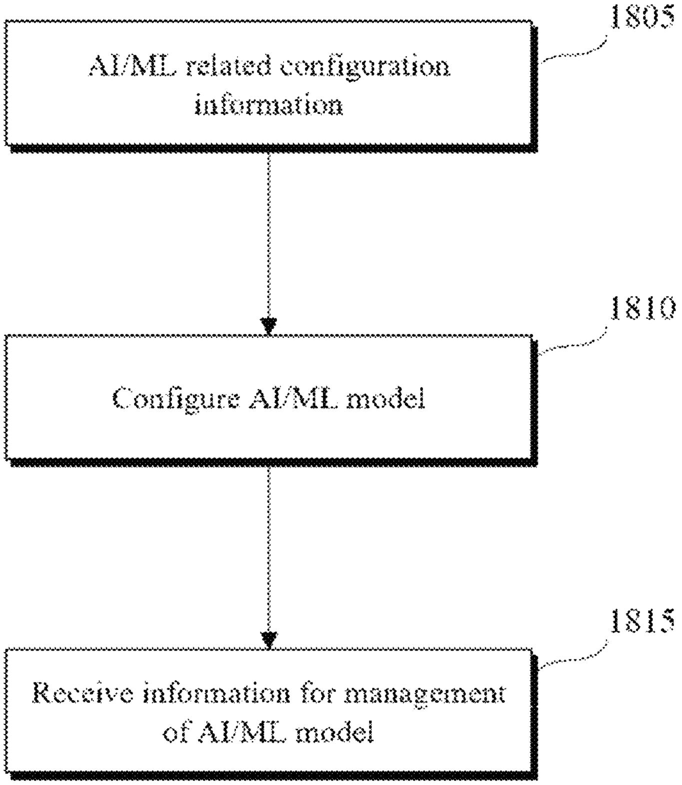
FIG. 18 is a diagram for explaining operations of a user equipment (UE) according to an embodiment.

FIG. 18 is a diagram for explaining operations of a user equipment (UE) according to an embodiment.

Referring to FIG. 18, a UE may receive (1805) artificial intelligence/machine learning (AI/ML) related configuration information, configure (1810) an AI/ML model for at least one transmission reception point (TRP) based on the received AI/ML related configuration information, and receive (1815) information for management of the configured AI/ML model. Based on that the UE supports multiple TRPs, the information for the management of the AI/ML model may individually indicate activation, deactivation, updating, or switching of the AI/ML model for each of the multiple TRPs.

The information for the management of the AI/ML model may be received through a medium access control (MAC) control element (CE).

The information for the management of the AI/ML model may be received through downlink control information (DCI).

The AI/ML related configuration information may be received through higher layer signaling.

A timer related to the activation, deactivation, updating, or switching of the AI/ML model may be configured individually for each of the multiple TRPs.

The timer may be configured through network signaling.

The timer may be restarted based on the reception of the information for the management of the AI/ML model.

The information for the management of the AI/ML model may include a relevant AI/ML model identifier (ID) or a relevant AI/ML functionality ID.

The indicated activation, deactivation, updating, or switching of the AI/ML model may be performed based on a reception timing of the information for the management of the AI/ML model or a transmission timing of an acknowledgment (ACK) for the information for the management of the AI/ML model.

Figure 19:
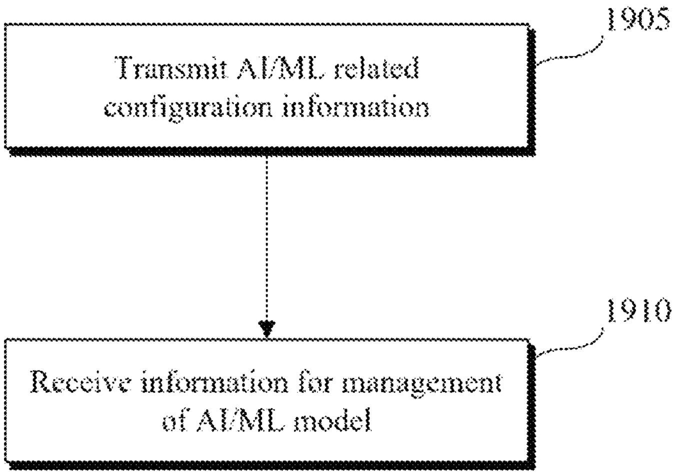
FIG. 19 is a diagram for explaining operations of a base station (BS) according to an embodiment.
Figure 20:
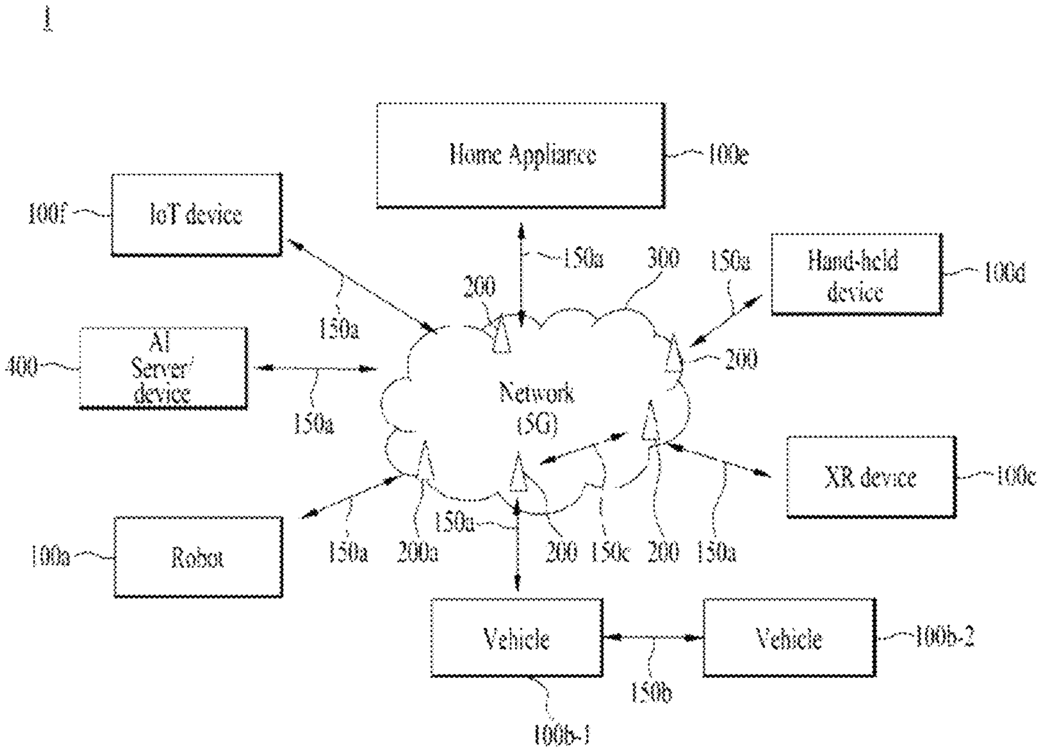
FIGS. 20 to 23 illustrate an example of a communication system 1 and wireless devices applied to the disclosure.
Figure 21:
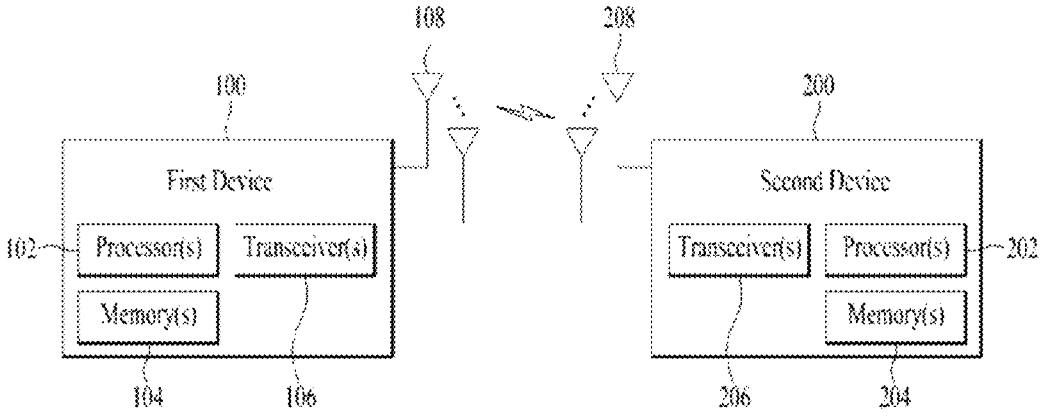

FIG. 19 is a diagram for explaining operations of a base station (BS) according to an embodiment.

Referring to FIG. 19, a base station (BS) may transmit (1905) AI/ML related configuration information to a UE to configure an AI/ML model for at least one TRP, and transmit (1910) information for management of the AI/ML model configured to the UE. Based on that the UE supports multiple TRPs, the information for the management of the AI/ML model may individually indicate activation, deactivation, updating, or switching of the AI/ML model for each of the multiple TRPs.

Figure 22:
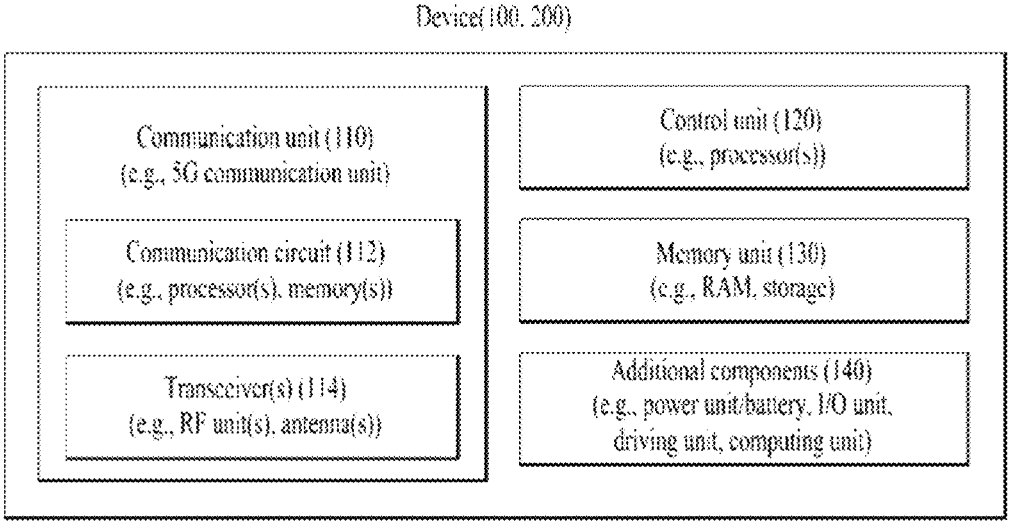

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 23:
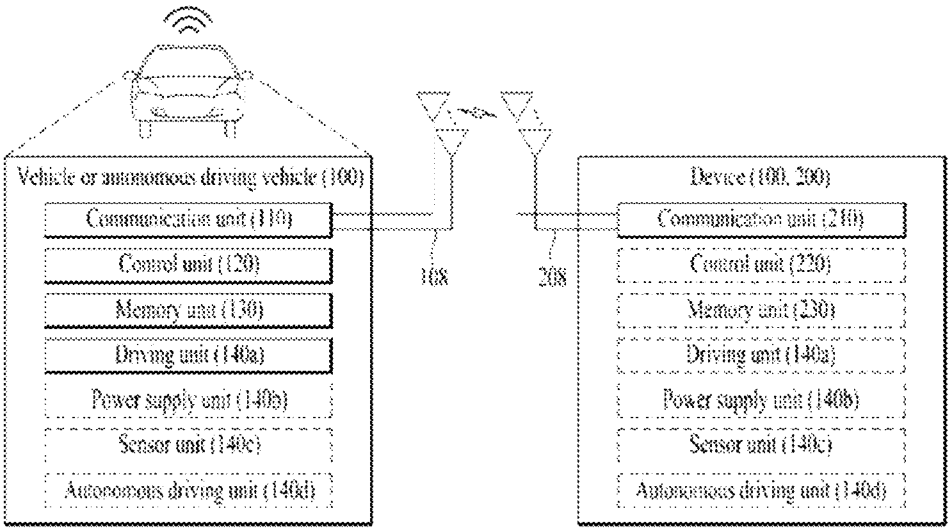

FIG. 23 illustrates a vehicle or an autonomous driving vehicle applied to the disclosure. The vehicle or autonomous driving vehicle may be implemented by a mobile robot, a car, a train, a manned/unmanned Aerial Vehicle (AV), a ship, etc.

Referring to FIG. 23, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 22, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 24:
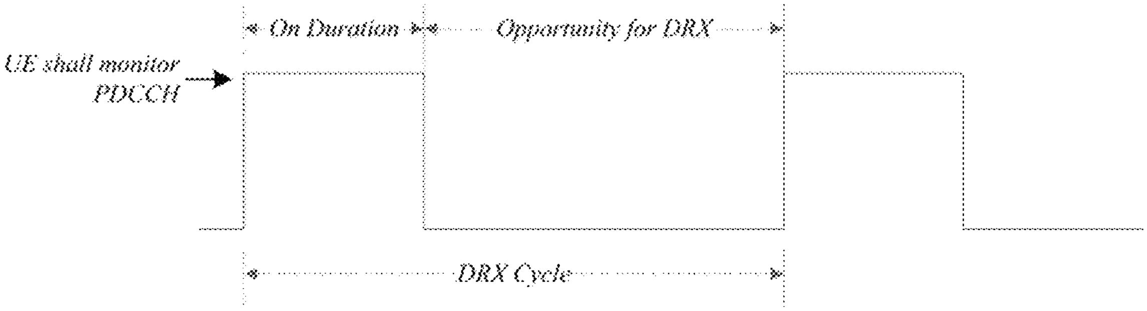
FIG. 24 illustrates an exemplary discontinuous reception (DRX) operation applicable to the disclosure.

FIG. 24 is a diagram illustrating a DRX operation of a UE according to an embodiment of the disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 24, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the disclosure. Irrespective of whether DRX is configured, PDCCH monitoring may be restricted during a time period configured as a measurement gap.

Table 9 describes a DRX operation of a UE (in the RRC_CONNECTED state). Referring to Table 9, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods.

TABLE 9

| | Type of signals | UE procedure |
|---|---|---|
| 1st step | RRC signalling (MAC-CellGroupConfig) | Receive DRX configuration information |
| 2nd Step | MAC CE ((Long) DRX command MAC CE) | Receive DRX command |
| 3rd Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

- Value of drx-OnDurationTimer: defines the duration of the starting period of the DRX cycle.
- Value of drx-InactivityTimer: defines the duration of a time period during which the UE is awake after a PDCCH occasion in which a PDCCH indicating initial UL or DL data has been detected
- Value of drx-HARQ-RTT-TimerDL: defines the duration of a maximum time period until a DL retransmission is received after reception of a DL initial transmission.
- Value of drx-HARQ-RTT-TimerDL: defines the duration of a maximum time period until a grant for a UL retransmission is received after reception of a grant for a UL initial transmission.
- drx-LongCycleStartOffset: defines the duration and starting time of a DRX cycle.
- drx-ShortCycle (optional): defines the duration of a short DRX cycle.

When any of drx-OnDurationTimer, drx-Inactivity Timer, drx-HARQ-RTT-TimerDL, and drx-HARQ-RTT-TimerDL is running, the UE performs PDCCH monitoring in each PDCCH occasion, staying in the awake state.

The above-described embodiments correspond to combinations of elements and features of the disclosure in prescribed forms. And, the respective elements or features may be considered as selective unless they are explicitly mentioned. Each of the elements or features may be implemented in a form failing to be combined with other elements or features. Moreover, it is able to implement an embodiment of the disclosure by combining elements and/or features together in part. A sequence of operations explained for each embodiment of the disclosure may be modified. Some configurations or features of one embodiment may be included in another embodiment or may be substituted for corresponding configurations or features of another embodiment. And, it is apparently understandable that an embodiment is configured by combining claims failing to have relation of explicit citation in the appended claims together or may be included as new claims by amendment after filing an application.

Those skilled in the art will appreciate that the disclosure may be carried out in other specific ways than those set forth herein without departing from the spirit and essential characteristics of the disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The disclosure is applicable to UEs, BSs, or other apparatuses in a wireless mobile communication system.

The invention claimed is:

1. A method performed by a user equipment (UE), the method comprising:

receiving artificial intelligence/machine learning (AI/ML) related configuration information;

configuring an AI/ML model for at least one transmission reception point (TRP) based on the received AI/ML related configuration information; and receiving information for management of the configured AI/ML model, wherein based on that the UE supports multiple TRPs, the information for the management of the AI/ML model individually indicates activation, deactivation, updating, or switching of the AI/ML model for each of the multiple TRPs.

2. The method of claim 1, wherein the information for the management of the AI/ML model is received through a medium access control (MAC) control element (CE).

3. The method of claim 1, wherein the information for the management of the AI/ML model is received through downlink control information (DCI).

4. The method of claim 1, wherein the AI/ML related configuration information is received through higher layer signaling.

5. The method of claim 1, wherein a timer related to the activation, deactivation, updating, or switching of the AI/ML model is configured individually for each of the multiple TRPs.

6. The method of claim 5, wherein the timer is configured through network signaling.

7. The method of claim 5, wherein the timer is restarted based on the reception of the information for the management of the AI/ML model.

8. The method of claim 1, wherein the information for the management of the AI/ML model includes a relevant AI/ML model identifier (ID) or a relevant AI/ML functionality ID.

9. The method of claim 1, wherein the indicated activation, deactivation, updating, or switching of the AI/ML model is performed based on a reception timing of the information for the management of the AI/ML model or a transmission timing of an acknowledgment (ACK) for the information for the management of the AI/ML model.

10. A device comprising:

a memory configured to store instructions; and a processor configured to perform operations by executing the instructions, wherein the operations of the processor comprise:

receiving artificial intelligence/machine learning (AI/ML) related configuration information;

configuring an AI/ML model for at least one transmission reception point (TRP) based on the received AI/ML related configuration information; and receiving information for management of the configured AI/ML model, wherein based on that the device supports multiple TRPs, the information for the management of the AI/ML model individually indicates activation, deactivation, updating, or switching of the AI/ML model for each of the multiple TRPs.

11. The device of claim 10, further comprising:

a transceiver, wherein the device is a user equipment (UE).

12. A method performed by a base station (BS), the method comprising:

transmitting, to a user equipment (UE), artificial intelligence/machine learning (AI/ML) related configuration information for configuring an AI/ML model for at least one transmission reception point (TRP); and transmitting information for management of the AI/ML model configured in the UE, wherein based on that the UE supports multiple TRPs, the information for the management of the AI/ML model individually indicates activation, deactivation, updating, or switching of the AI/ML model for each of the multiple TRPs.

* * * * *